United States Patent
Chen et al.

(10) Patent No.: US 11,675,766 B1
(45) Date of Patent: Jun. 13, 2023

(54) SCALABLE HIERARCHICAL CLUSTERING

(71) Applicant: Amazon Technologies, Inc., Seattle, WA (US)

(72) Inventors: Xianshun Chen, Seattle, WA (US); Kai Liu, Bothell, WA (US); Nikhil Anand Navali, Seattle, WA (US); Archiman Dutta, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 461 days.

(21) Appl. No.: 16/808,162

(22) Filed: Mar. 3, 2020

(51) Int. Cl.
*G06F 16/22* (2019.01)
*G06F 16/28* (2019.01)
*G06F 16/901* (2019.01)

(52) U.S. Cl.
CPC ........ *G06F 16/2246* (2019.01); *G06F 16/285* (2019.01); *G06F 16/9024* (2019.01)

(58) Field of Classification Search
CPC ............. G06F 16/9024; G06F 16/9038; G06F 16/285; G06F 16/2246
USPC ................................ 707/696, 769, 797, 798
See application file for complete search history.

(56) References Cited

U.S. PATENT DOCUMENTS

| | | | |
|---|---|---|---|
| 7,644,102 B2 | 1/2010 | Gaussier et al. | |
| 8,140,491 B2 | 3/2012 | Mandagere et al. | |
| 8,200,640 B2 | 6/2012 | Arasu et al. | |
| 8,321,648 B2 | 11/2012 | Condict | |
| 8,407,164 B2 | 3/2013 | Malik et al. | |
| 10,078,676 B2* | 9/2018 | Bhagat | G06F 16/258 |
| 10,157,045 B2* | 12/2018 | Venkataramani | G06N 3/048 |
| 10,303,797 B1 | 5/2019 | Menezes et al. | |
| 10,789,065 B2* | 9/2020 | Garvey | G06F 8/71 |
| 2007/0239745 A1 | 10/2007 | Guerraz et al. | |
| 2008/0288482 A1* | 11/2008 | Chaudhuri | G06F 16/24556 707/999.005 |
| 2009/0037440 A1 | 2/2009 | Will et al. | |
| 2013/0262500 A1* | 10/2013 | Brats | H04L 43/103 707/769 |
| 2016/0070706 A1* | 3/2016 | Lee | G06F 16/951 707/751 |
| 2016/0292192 A1* | 10/2016 | Bhagat | G06F 16/258 |
| 2018/0136912 A1* | 5/2018 | Venkataramani | G06F 8/35 |
| 2018/0150724 A1 | 5/2018 | Brock | |
| 2019/0339965 A1* | 11/2019 | Garvey | G06F 16/24578 |

OTHER PUBLICATIONS

Hossein Esfandiari et al., "Parallel and Streaming Algorithms for K-Core Decomposition", dated Nov. 23, 2018, pp. 1-13.

(Continued)

*Primary Examiner* — Phong H Nguyen
(74) *Attorney, Agent, or Firm* — Robert C. Kowert; Kowert, Hood, Munyon, Rankin & Goetzel, P.C.

(57) ABSTRACT

A hierarchical representation of an input data set comprising similarity scores for respective entity pairs is generated iteratively. In a particular iteration, clusters are obtained from a subset of the iteration's input entity pairs which satisfy a similarity criterion, and then spanning trees are generated for at least some of the clusters. An indication of at least a representative pair of one or more of the clusters is added to the hierarchical representation in the iteration. The hierarchical representation is used to respond to clustering requests.

18 Claims, 18 Drawing Sheets

(56) References Cited

OTHER PUBLICATIONS

Unknown "GraphStream—The Connected Components Algorithm", pp. 1-4, Dated Feb. 8, 2020.
Unknown "Kruskal's Algorithm", pp. 1-8, , Dated Feb. 8, 2020.
Wissam Khaouid et al, "K-Core Decomposition of Large Networks on a Single PC", Proceedings of the VLDB Endowment, vol. 9, No. 1, dated 2015, pp. 1-11.
Unknown "Single-Linkage Clustering", pp. 1-6, Dated Feb. 8, 2020.
Wikipedia "Minimum Spanning Tree", pp. 1-15, Dated Jan. 12, 2020.

* cited by examiner

Input edge pair collection (IEPC) 510 corresponding to initial graph 512 (note: graph 512 shown has not actually been generated, the entity pair information will be used to generate portions of the graph as part of the algorithm)

Graph 512

Thick edges 514 meeting iteration's similarity threshold are selected/filtered for clusters construction Representative nodes (RNs) 520 (indicated by circles within squares) are identified for each spanning tree/cluster, and multiple edges between each spanning tree are replaced by a single aggregated edge between their RNs; entries indicating RNs and their similarity scores w.r.t each node of their clusters is added to hierarchical cluster representation (HCR)

ss = similarity score
w = edge weight = (1 − ss)
sp = shortest path (based on cumulative weight of edges along path)
ahs = average hop score
mahs = mean of average hop scores

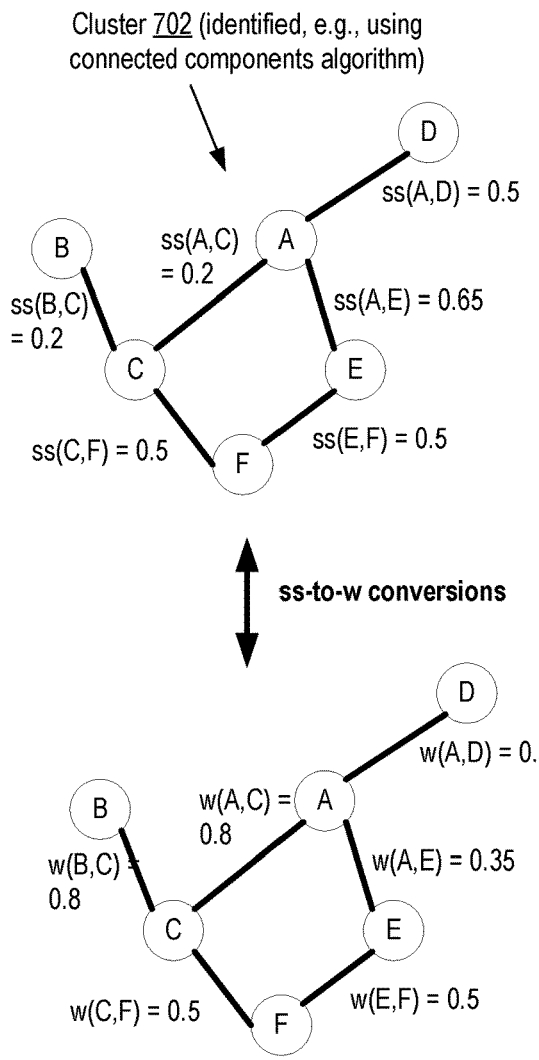

Cluster 702 (identified, e.g., using connected components algorithm)

ss-to-w conversions

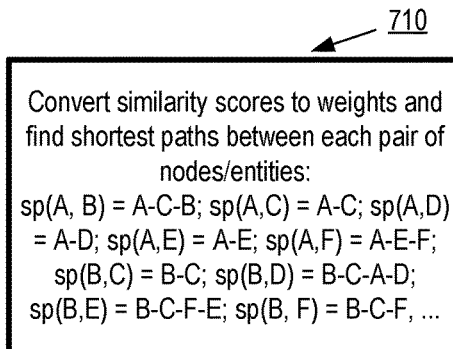

710

Convert similarity scores to weights and find shortest paths between each pair of nodes/entities:
sp(A, B) = A-C-B; sp(A,C) = A-C; sp(A,D) = A-D; sp(A,E) = A-E; sp(A,F) = A-E-F; sp(B,C) = B-C; sp(B,D) = B-C-A-D; sp(B,E) = B-C-F-E; sp(B, F) = B-C-F, ...

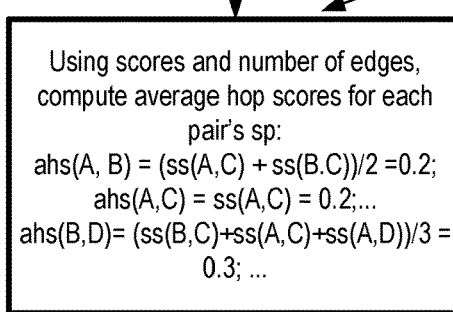

715

Using scores and number of edges, compute average hop scores for each pair's sp:
ahs(A, B) = (ss(A,C) + ss(B.C))/2 = 0.2;
ahs(A,C) = ss(A,C) = 0.2;...
ahs(B,D)= (ss(B,C)+ss(A,C)+ss(A,D))/3 = 0.3; ...

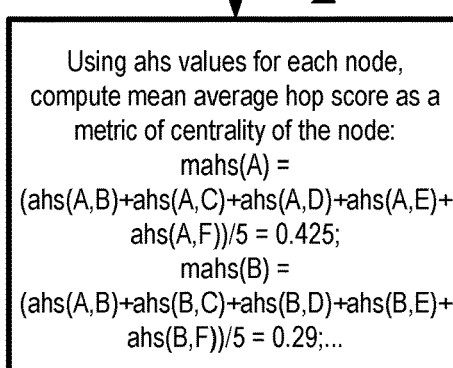

720

Using ahs values for each node, compute mean average hop score as a metric of centrality of the node:
mahs(A) = (ahs(A,B)+ahs(A,C)+ahs(A,D)+ahs(A,E)+ ahs(A,F))/5 = 0.425;
mahs(B) = (ahs(A,B)+ahs(B,C)+ahs(B,D)+ahs(B,E)+ ahs(B,F))/5 = 0.29;...

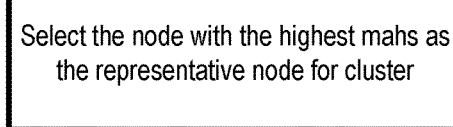

725

Select the node with the highest mahs as the representative node for cluster

FIG. 7

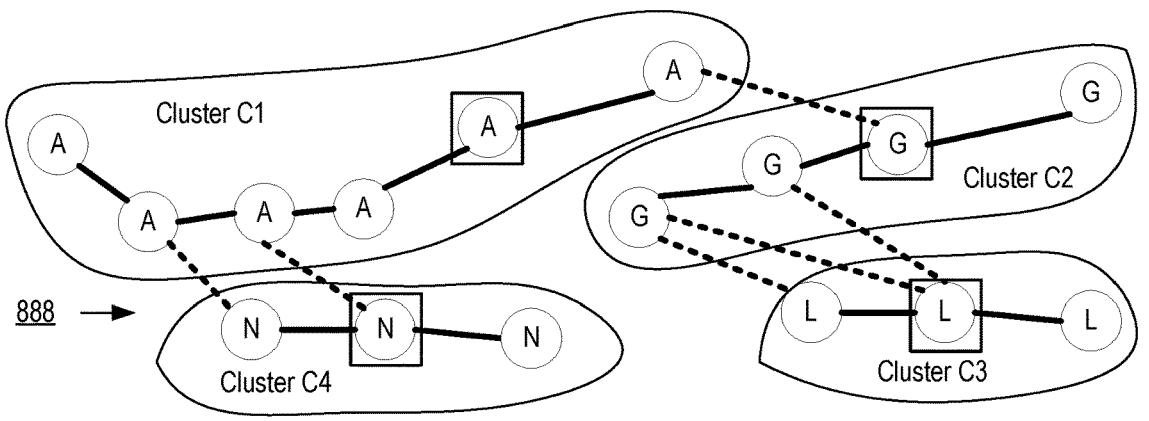
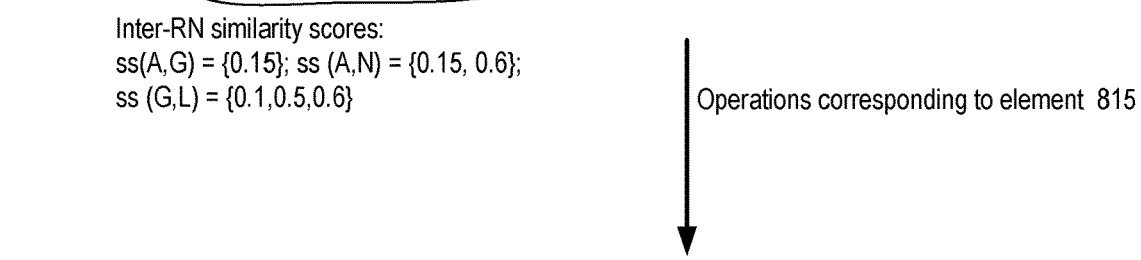
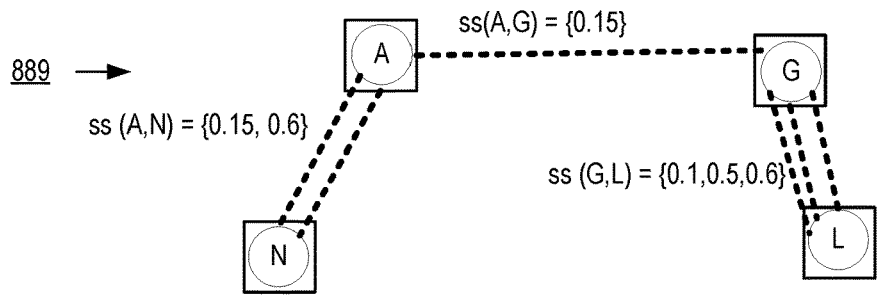
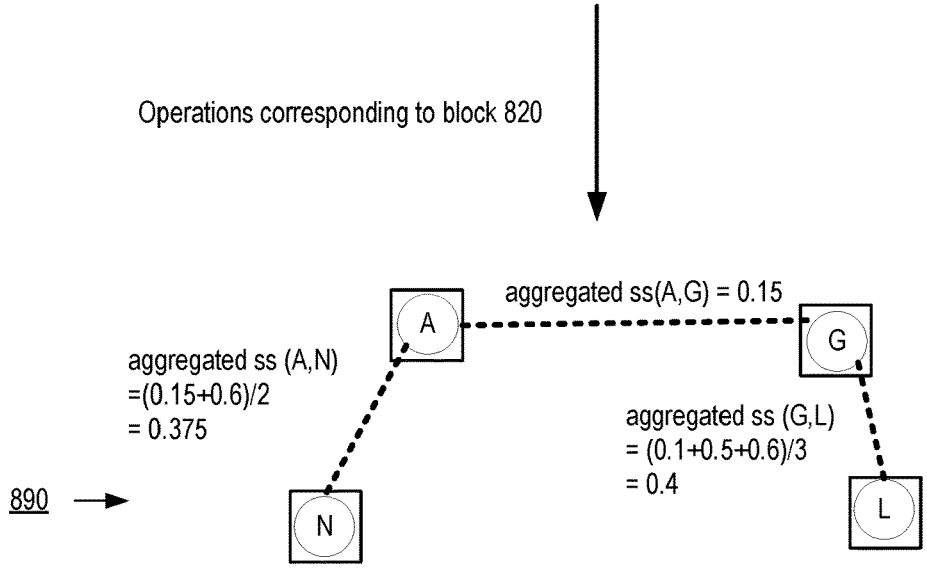
FIG. 8b

Example metrics 901

Reduction rate 910 (or compression rate, which is = 1/(reduction rate))

Precision 915

Large cluster count/percentage 920

Maximum cluster size 925

Average cluster size 930

Average multi-node cluster size 935

*FIG. 9*

SCALABLE HIERARCHICAL CLUSTERING

BACKGROUND

In recent years, more and more raw data that can potentially be utilized for solving complex analytics problems is being collected from a large variety of sources, such as sensors of various kinds including medical equipment, e-retail catalog entries, web server logs, social media services, financial transaction records, security cameras, and the like. A variety of analytics techniques, including machine learning, statistics, graph theory and the like can be combined to create algorithms that can solve problems in various domains such as natural language processing, image processing, financial fraud detection, human health diagnosis and the like.

Finding solutions to the problem of identifying duplicate entities in a large group of entities, or of identifying closely matching entities from such groups, is important for a variety of applications. For example, databases containing records from multiple sources may sometimes have to be merged, as when two business organizations combine into a single organization. A customer database from one of the organizations may store information about customers in a different format, or using a different schema, than the format or schema used by the other organization, and identifying and removing duplicate entries may be desirable. In another context, identifying duplicate items (or clusters of near-duplicate items) within large item catalogs may be helpful for organizing the catalogs, responding to search queries, and so on.

A number of algorithms have been developed in an attempt to address similarity-based clustering or deduplication of data records. Unfortunately, some of the commonly-used algorithms fail to scale as larger input data sets have to be processed. Other algorithms may sometimes end up generating clusters which contain at least some highly dissimilar records, which is undesirable. Reliably generating clusters of closely-matched records from very large input data sets remains a challenging technical problems.

BRIEF DESCRIPTION OF DRAWINGS

FIG. 7 illustrates example operations that may be performed to identify a representative node from a cluster, according to at least some embodiments.

FIG. 8a and FIG. 8b collectively illustrate example operations that may be performed to reduce the number of inter-cluster edges, according to at least some embodiments.

FIG. 9 illustrates example clustering relating metrics which may be generated and presented for various data sets, according to at least some embodiments.

Figure 1:
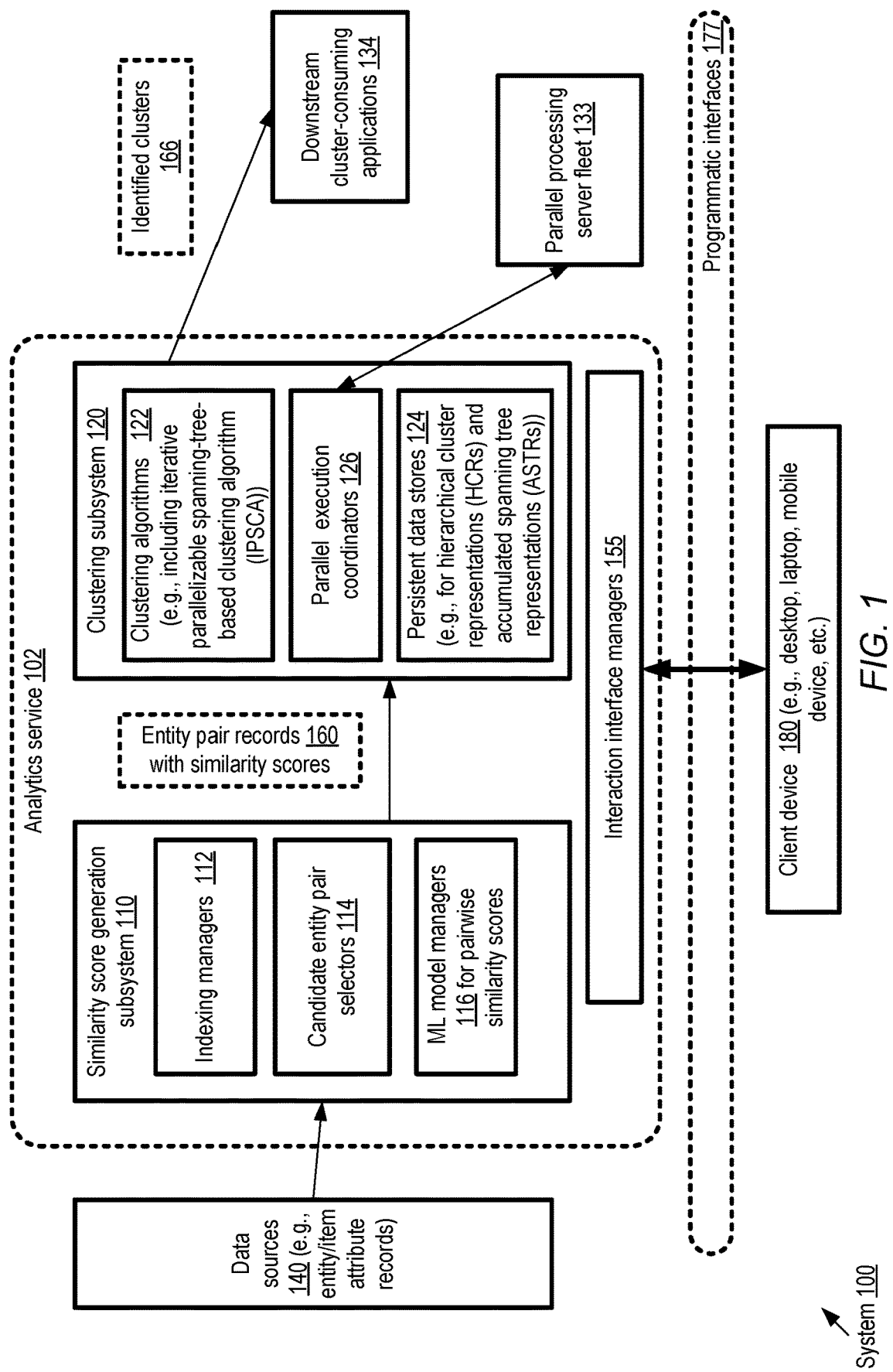
FIG. 1 illustrates an example system environment in which a scalable spanning-tree based clustering algorithm may be implemented for large data sets, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for scalable clustering of a data set comprising large numbers of records associated with respective entities or items. A highly scalable iterative spanning-tree based clustering algorithm may be employed in various embodiments, comprising several phases of computations which may each be executed in parallel at a fleet of computing resources, thus providing high levels of scalability as the size of the input data set increases. In some embodiments, the proposed technique may comprise at least two phases or stages: a pre-compute phase and a run-time clustering phase. In the pre-compute phase, spanning-tree based graph representations may be generated once for a given input data set; in the run-time clustering phase, the pre-computed graph representations may be used as often as desired to identify clusters with different target properties (such as different thresholds for the minimum similarity of the members of any one of the clusters relative to one another), without having to re-generate the graphs. In effect, much of the computational effort required to identify matching entities in very large data sets may be expended in the one-time pre-compute phase, and the benefits of the pre-computed graphs may be accrued repeatedly, e.g., to solve respective problems using a variety of clustering-dependent downstream applications with different target precision or intra-cluster similarity requirements.

As one skilled in the art will appreciate in light of this disclosure, certain embodiments may be capable of achieving various advantages, including some or all of the following: (a) reducing the overall amount of time, CPU, memory, networking and storage resources that have to be utilized for identifying clusters within extremely large input data sets, especially in environments in which clusters with different similarity thresholds may have to be generated from the same input data set, (b) enhancing the user experience of clients interacting with analytics services at which the spanning-tree based clustering algorithm is implemented, e.g., by providing simplified visualizations of identified clusters and cluster properties such as average similarities between the nodes of the clusters, and/or (c) enhancing the user experience of end users of various web-based applications, e.g., by providing better results for searches and comparisons using identified clusters.

According to at least some embodiments, a system may comprise one or more computing devices, e.g., at a network-accessible analytics service implemented as part of a provider network or cloud computing environment. The computing devices may include instructions that when executed on or across one or more processors cause the devices to obtain an input data set which comprises a plurality of entity pairs and respective similarity scores for at least some of the entity pairs. In some implementations, for example, similarity scores may comprise real numbers between 0 and 1, with higher scores indicating greater similarity between the entities of the pair, and lower scores representing lesser similarity. Other encoding schemes for similarity scores may be used in different embodiments.

As part of a pre-compute phase of a parallelizable spanning-tree based algorithm, the instructions when executed on the computing devices may cause the computing devices to generate a hierarchical representation of the input data set using a plurality of analysis iterations in some embodiments. A particular iteration may comprise at least some of the following operations in one embodiment. A similarity threshold may be identified for the particular iteration (e.g., by reducing the similarity threshold used for the previous iteration by some selected delta amount, if there was a previous iteration, or by setting the threshold to some selected starting value corresponding to an input hyper-parameter of the algorithm). From an input identity pair collection of the iteration, a subset of pairs with similarity scores above the similarity threshold selected for that iteration may be identified. From the selected subset of entity pairs, one or more clusters may be generated, e.g., using an algorithm similar to a connected components algorithm. At least some of the generated clusters may comprise a respective plurality of nodes and a plurality of edges in some cases, such that at least one path comprising one or more edges exist between a given pair of the nodes; the nodes may represent the entities of the input entity pair collection, and the edges may represent the similarity scores which satisfy the threshold criterion for the iteration. In at least some cases, multiple paths may exist between some pairs of nodes in the clusters that were generated.

Corresponding to individual ones of the generated clusters, a respective spanning tree may be identified, resulting in the elimination of some of the edges in the cluster in at least some cases. A spanning tree is a transformed version of a cluster, in which there is exactly one path between a given pair of nodes (whereas the original cluster may have included multiple paths between some pairs of nodes). In some embodiments, a minimum spanning tree algorithm may be executed on the cluster to obtain the spanning tree, e.g., after temporarily converting the similarity scores to weights (e.g., in an implementation in which similarity scores are numbers between 0 and 1, the weights may be obtained by subtracting each similarity score from 1); such minimum spanning trees algorithms construct trees so as to minimize the sum of the weights of the edges of the tree. In other embodiments, a maximum spanning tree algorithm may be employed, using the original similarity scores without converting them to weights. Whether a minimum or maximum spanning tree algorithm is used may thus depend on the specific encoding used to represent node-pair similarity, and the type of spanning tree algorithm used may accordingly differ in different implementations. (Note that some clusters may not have multiple paths between any pairs of nodes, so the spanning tree for the cluster would be identical to the cluster itself.)

After the spanning trees have been identified for respective clusters in a given iteration of the clustering algorithm, in at least some embodiments the edges of the spanning trees may be added to an accumulated spanning tree representation (ASTR) (which grows from one iteration to another). Thus, for example, the total number of edges in the ASTR after iteration (K+1) of the algorithm may be greater than the total number of edges in the ASTR after iteration (K), because new edges of the identified spanning trees for iteration (K+1) have been added, and edges of spanning trees identified in earlier iterations have been retained. In at least some embodiments, a persistent data structure or data store comprising one or more persistent storage devices may be used for the ASTR. After spanning trees have been generated for the clusters, the terms "cluster" and "spanning tree" may be used interchangeably to refer to the same underlying set of connected nodes for one or more subsequent computations of the algorithm as described herein.

In addition to adding edges to the ASTR, entries may also be added to an accumulated hierarchical representation of the input data set in a given iteration in various embodiments. The accumulated hierarchical representation may be referred to as a hierarchical cluster representation (HCR) in at least some embodiments. A representative node (RN) may be selected for each of the spanning trees identified in the iteration, and information about the RNs may be added to the HCR, for example. The RN may be selected after computing centrality measures for all the nodes in a spanning tree in some embodiments; a particular node may be selected as the RN if a measure of its similarity with respect to all the remaining nodes exceeds the corresponding measure for any of the remaining nodes. The information incorporated into the HCR may include the identity of the RNs for the spanning trees, as well as (potentially adjusted) similarity scores between the RNs and the other nodes of their spanning trees in at least one embodiment. As in the case of the ASTR, the HCR may grow from one iteration to the next in various embodiments, as different sets of spanning trees are identified for different similarity thresholds. In at least some embodiments, a persistent data structure or data store comprising one or more persistent storage devices may be used for the HCR.

One of the termination criteria for the iterative algorithm may include a minimum similarity threshold for which spanning trees and corresponding RNs are to be identified; further iterations may not be needed after the minimum similarity threshold is crossed or reached in various embodiments. If there is to be a next iteration (that is, if reducing the current iteration's threshold by the inter-iteration delta does not result in termination of the iterations of the algorithm), the entity pair collection to be used for the next iteration may be generated in various embodiments as one of the operations in a given iteration. In at least some embodiments, a cluster compression technique may be employed to help generate the next iteration's input entity pairs. In such a cluster compression technique, the ASTR and an inter-spanning-tree edge aggregation algorithm may be used to exclude at least some entity pairs which were part of the input for the current iteration; accordingly the cluster compression technique may also be referred to as an edge reduction technique. In effect, in at least some embodiments, if multiple edges in the input edge collection for the current iteration connect a given pair of clusters identified in the current iteration, those multiple edges would be replaced by a single edge in the input for the next iteration. The next iteration would then be executed, using similar logic to that described above: identifying the similarity threshold, selecting a subset of entity pairs from the input which meet the similarity threshold, constricting clusters and spanning trees, adding edges to the ASTR, identifying RNs to be added to the HCR, and so on.

As indicated above, the iterative technique described above, in which more entries are added to the HCR (and the ASTR) corresponding to different (e.g., decreasing) similarity thresholds as more iterations are run, may be referred to as a pre-compute phase of the overall clustering workflow in various embodiments. For a given input data set, the HCR and the ASTR may have to be generated only once in such embodiments. After they are generated, the saved (or pre-computed) HCR and the ASTR may be re-used to respond to a variety of programmatic requests in various embodiments, e.g., as part of a run-time clustering phase of the overall workflow after the pre-compute phase is completed. For example, one client of the analytics service may submit a request to obtain clusters with a threshold intra-cluster similarity value S1 in the run-time clustering phase (i.e. clusters such that each entity represented in a given cluster has at least an S1 similarity score with respect to each of the other nodes of the given cluster), and the HCR may be used to provide the indication of such clusters (i.e., the entities corresponding to the RNs identified in an iteration with similarity threshold S1, and the entities corresponding to the member nodes of the spanning trees to which the RNS belong). If a different client (or the same client) submits a clustering request for a different threshold intra-cluster similarity value S2, the same HCR may be used to obtain a different set of clusters which satisfy the S2 threshold in various embodiments, without having to re-analyze the input data or re-generate the HCR. The ASTR and/or the HCR may be used to provide visualizations of portions or all of the input data in various embodiments, allowing clients of the analytics service to explore the input data (with many of the edges corresponding to the entity pairs having been removed, thus simplifying the views provided and making the data set easier to understand). In at least some embodiments, information about clusters identified using the pre-computed HCRs and the ASTRs may be transmitted to one or more downstream applications, e.g., search engines, catalog management applications of e-retail web sites, comment analysis applications and the like, where it may be used to respond to requests of the clients of those applications. At the downstream applications, the cluster information may be used, for example, to provide more accurate search results, to remove duplicated items from an e-retail catalog, and/or to assess, as a group, the user-generated comments pertaining to entities which have been identified as members of the same cluster. By determining which entities are near-duplicates of each other more accurately, and then examining the comments generated for such entities, a more accurate view of user feedback for the closely-related items may be obtained, or differences in the relative popularity of different features of the similar entities may be determined.

In at least some embodiments, various sets of operations of the iterative algorithm may be performed at least in part in parallel, e.g., using respective sets of computing servers of a parallel computing service or parallel computing framework. For example, the number of computing resources (such as respective servers, implemented using physical or virtual machines) to be used in parallel for cluster generation may be determined, that number of computing resources may be identified from a pool of available resources, and the identified resources may be used to identify or generate the clusters (e.g., using a parallel version of a connected components algorithm or the equivalent thereof) from the subset of entity pairs selected for a given iteration. Similarly, the number of computing resources to be used for generating spanning tress may be determined, a plurality of computing resources (which may in some embodiments include some of the same resources which were used for generating the clusters) may be identified for generating the spanning trees from the clusters, and a parallel version of a spanning tree algorithm (e.g., a Kruskal algorithm or the like) may then be used on the identified resources. The cluster compression step, in which the next iteration's input entity pair collection is identified and some inter-cluster edges are removed may similarly be parallelized in at least some embodiments using a plurality of computing resources, e.g., running an edge reduction (or edge aggregation) algorithm at several of the servers in parallel. The number of computing resources to be used in parallel at each stage may be determined, for example based on some combination of factors such as the total size of the input data for the stage, the computing and memory capacities of the resources available, and so on. In at least some embodiments, a subset of the data to be processed may be sent to respective ones of the plurality of computing resources at each parallelized stage, and the particular tasks to be performed (e.g., identifying clusters, identifying spanning trees from clusters, or identifying and reducing inter-cluster edges) may then be implemented at each of the computing resources on the subset received at that computing resource. Results from all the computing resources may be accumulated in some cases before being re-distributed if needed for the next steps of the processing. In one implementation, a parallel programming framework similar to the Apache Spark framework may be employed, e.g., at a parallel processing service of a provider network.

A number of different types of computations may be performed in various embodiments to identify the representative nodes of a given spanning tree corresponding to a cluster. Using the known similarity scores for the pairs of nodes of the spanning tree, a first intermediate metric of similarity (which may be referred to as an "average hop score") between all possible pairs of nodes of the spanning tree may be generated. Then, for each of the nodes, a statistical aggregate (e.g., a mean) of the set of first intermediate metrics for that node (i.e., for all the node pairs of which that node is a member) may be obtained. The node which satisfies a particular criterion (e.g., the node with the highest mean average hop score) may be selected as the representative node in some embodiments, e.g., by comparing the statistical aggregates for the different nodes.

In various embodiments, an analytics service at which the clustering technique described above is run may implement a set of programmatic interfaces which can be used by clients to submit various types of clustering-related requests and receive corresponding responses. Such programmatic interfaces may include, for example, a web-based console, a set of application programming interfaces (APIs), command-line tools, graphical user interfaces and the like in different embodiments. Using such interfaces, in some embodiments a client may submit a request to run the pre-compute phase of the algorithm in which the HCR is generated, for a data set indicated in the request, and the analytics service may then run the iterative algorithms of the kind introduced above. In one embodiment, a client may submit a visualization request for at least a portion of the input data set and/or the results of the pre-compute phase. In response to such a visualization request, the analytics service may cause a graphical view of at least a portion of the HCR to be presented to the client. In such a graphical view, a visual property of an icon representing a particular representative node of a particular cluster may be used to indicate a centrality measure computed with respect to the particular representative node and the particular cluster; that is, information about how similar the cluster members are to the representative node may be provided visually in such an embodiment. For example, a smaller icon (or an icon of a different color) may be used to show a representative node which is less similar (on average) to other nodes of its cluster, while a larger icon (or another color) may be used to show a representative node which is more similar (on average) to the other nodes of its cluster. In some embodiments, clients may submit target ranges of various metrics associated with clustering, such as a precision metric, a reduction rate metric (the total number of clusters identified, as a fraction of the total number of entities represented in the input data set), a recall metric, or target intra-cluster similarity thresholds. Such target metric-related input provided by the clients may be used, for example, to determine various parameters of the iterative algorithm, such as the delta amounts by which the similarity thresholds are changed from one iteration to another, the termination criterion for the iterations as a whole, and so on.

In some embodiments, the basic algorithm outlined above for the pre-compute stage may be optimized in one of several ways. For example, the step of creating the spanning trees from the clusters may be modified as follows, in order to avoid excessive computation costs that may potentially be encountered when spanning trees have to be constructed for large clusters. The sizes (number of nodes) of each of the identified clusters may be determined. If the size of a given cluster is below a threshold parameter (e.g., a parameter specified by a client or determined at the analytics service), a spanning tree for the entire cluster may be generated. If the size equals or exceeds the threshold, the cluster may be designated as a large cluster, and one of two approaches may be taken in some embodiments, depending for example on another input parameter. Either no spanning tree may be generated at all for the large cluster (that is, instead of using the spanning tree version of the cluster in the remaining steps, the entire cluster may be used), or the large cluster may be broken up into smaller clusters, and respective spanning trees may be generated for each of the smaller clusters and used in the remaining steps.

In some embodiments, the similarity scores included in the input for the iterative approach described above may be obtained from a subsystem of the analytics service. For example, raw input data about attributes of various entities may be provided to the analytics service, and the similarity scores for at least a subset of entity pairs may be generated at the subsystem using machine learning or other algorithms.

Example System Environment

FIG. 1 illustrates an example system environment in which a scalable spanning-tree based clustering algorithm may be implemented for large data sets, according to at least some embodiments. As shown, system 100 includes resources and artifacts of an analytics service 102, which comprises at least two subsystems: a similarity score generation subsystem 110 and a clustering subsystem 120. The analytics service 102 may be implemented at a provider network or cloud computing environment in some embodiments. The service 102 may implement a set of programmatic interfaces 177 in the depicted embodiment, such as web-based consoles, APIs, graphical user interfaces, command line tools and the like, which may be utilized by various clients to submit requests related to clustering and other types of analysis from client devices 180 (e.g., desktops, laptops, mobile computing devices, etc.) and receive corresponding responses. In some embodiments the analytics service 102 may comprise a collection of interaction interface managers 155 implemented at one or more computing devices, which may receive or obtain the submitted client requests and re-direct the requests (or send internal versions of the requests) to the appropriate subsystem, such as the similarity score generation subsystem or the clustering subsystem In at least some embodiments, a client of the analytics service may provide an indication of a data source 140 from which raw data records pertaining to a set of entities for which clustering is to be performed may be obtained or accessed. For example, such raw data records may comprise names, identifiers and attribute values for entities such as customers of an organization, patients and practitioners of a health care system, items of an e-retail catalog, and so on, depending on the specific problem domain to be addressed via clustering. The raw data may first be processed at the similarity score generation subsystem 110, where a workflow involving a number of subcomponents may be employed to generate pairwise similarity scores for at least a subset of the entities represented in the raw data. One or more indexing managers 112 may use the attribute information contained in the raw input to generate indexes on the entities in some embodiments, which can then be used to conduct a preliminary search for entities likely to be similar to any given entity. Using the indexes, a set of candidate entity pairs for which it appears reasonable to compute similarity scores may be identified for the entities of the raw data set by one or more candidate entity pair selectors 114. For example, in one implementation, from a raw data set comprising information about properties or attributes of 10,000,000 entities E1 through E10000000, for a given entity E1, a set of 200 candidate pairs comprising pairs (E1, E2), (E1, E234), (E1, E577), (E1, E3412917), . . . , and so on may be identified. Then, in at least some embodiments, one or more machine learning models may be executed, e.g., by model managers 116, to generate the pairwise similarity scores for the candidate entity pairs. In at least some embodiments, records indicating the entity pairs and their respective computed similarity scores may be stored at a persistent data repository of the analytics service 102. This set of entity pair records 160, which includes similarity scores for various pairs of entities identified in a given raw data set, may be provided as input by the clustering subsystem 120 in the depicted embodiment. In some embodiments, instead of using the analytics service to generate the similarity scores, a client may generate the entity pair records 160 using other resources for at least some raw data sets, and provide (or indicate the location of) the entity pair records with the similarity scores as input via programmatic interfaces 177.

At the clustering subsystem 120, any of a variety of clustering algorithms 122 may be applied to the input entity pair records 160, e.g., in response to programmatic requests from clients submitted via programmatic interfaces 177. In one embodiment, a client may specify the particular clustering algorithm to be used for a given input data set 160, while in other embodiments clients may simply request clustering of the data, and the analytics service 102 may select the specific algorithm to be used. In the depicted embodiment, the set of clustering algorithms 122 supported at the clustering subsystem 120 may include at least an iterative parallelizable spanning-tree based clustering algorithm (IPSCA).

The IPSCA may comprise a pre-compute phase and a run-time clustering phase in at least some implementations. In the pre-compute phase, as discussed below in further detail, the input entity pair records may be analyzed iteratively, with each iteration corresponding to a particular similarity threshold selected from a range of similarity thresholds, to produce at least a hierarchical cluster representation (HCR) and an accumulated spanning tree representation (ASTR) of the input data. Within a given iteration, in at least some embodiments respective sets of computations may be performed to generate clusters from a filtered entity pair collection identified for the iteration, to generate spanning trees from the clusters, to compute representative nodes identified based on centrality measures from the spanning trees, and then to generate the input entity pairs for the next iteration using an inter-cluster edge reduction/aggregation technique. Because the clusters have been transformed to spanning trees by this stage of the iteration, the inter-cluster edge reduction/aggregation technique may also be referred to as an inter-spanning-tree edge reduction/aggregation technique. Details and examples pertaining to the different kinds of computations are provided below. The HCR may include information about representative nodes identified for various clusters generated at different intra-cluster similarity levels as the iterations proceed, which can then be used in the run-time clustering phase to respond to client requests for clusters with numerous different intra-cluster similarity levels without having to re-process the input entity pairs 160 for each different intra-cluster similarity level. The ASTR may include spanning trees identified for the various clusters represented in the HCR, and may typically eliminate numerous edges from the graphs corresponding to the input entity pairs as a whole, which makes the input data 160 easier to process and visualize. The HCR and/or the ASTR, which grow as more analysis iterations are performed, may be stored in persistent storage in some embodiments, e.g., at one or more persistent data stores 124.

In the run-time clustering phase, the pre-computed HCR and the ASTRs may be used to respond to specific clustering requests submitted from client devices 180, and/or to provide identified clusters 166 to one or more downstream cluster-consuming applications 134. In an e-retail problem domain, for example, the downstream applications 134 may comprise one or more of (a) a search application of an e-retail web site, (b) a catalog analysis or catalog management application, or (c) a comment analysis application (which may be employed for example to compare customer comments regarding similar items, and hence obtain a better understanding of the customer views of similar items). The cluster-consuming applications 134 may in turn take automated actions based on the provided identified clusters 166 in various embodiments (for example, search indexes may be modified to provide improved search results, catalogs may be reorganized to capture similar items within categories and sub-categories, and so on). In some embodiments, the downstream applications 134 may be provided the HCRs and/or the ASTRs, and may utilize these transformed representations of the input data 160 as needed. In at least one embodiment, the re-compute phase may not have to be completed before the HCR and/or the ASTR is used to respond to client requests—e.g., a partially-complete HCR or ASTR, stored during a particular non-final iteration of the pre-compute phase, may be used to respond to some types of clustering requests or to provide clustering information to downstream cluster-consuming applications 134.

In at least some embodiments, various operations of the pre-compute phase of the IPSCA may be implemented at multiple servers or resources in parallel, thus enabling scaling of the IPSCA as the input data set size increases. For example, in the depicted embodiment, a set of parallel execution coordinators 126 implemented at one or more computing devices may identify, for several of the sub-computations of the pre-compute iterations, a respective set of servers from a parallel processing server fleet 133, and distribute the workload for those sub-computations among the identified servers. Note that the total number of servers used in parallel by the coordinators 126 may vary from one set of operations of a given iteration to another (e.g., operations for generating clusters versus operations for generating spanning trees versus operations for compressing spanning trees/clusters), and/or from one iteration to another, e.g., based on the size of the input data being processed in each iteration. In some embodiments, a combination of sequential and parallel processing approaches may be used: e.g., for some computations of some iterations, a parallel processing server fleet may be employed, while for other computations, a single server may suffice. In some embodiments, a parallel processing server fleet may also or instead be employed for at least some tasks performed in the run-time clustering phase of the IPSCA. Note that the use of parallel processing servers is not a requirement for the execution of the IPSCA, although such use may of course help with scalability; the IPSCA may be run successfully on a single server of desired in various embodiments.

Clients of the analytics service may indicate various preferences with respect for clustering tasks to be performed on their behalf in the depicted embodiment via the programmatic interfaces 177. For example, a client may submit a programmatic request to perform the pre-compute phase for a specified data set 160 with a set of specified target ranges of one or more metrics, and this may trigger the creation of the HCR and the ASTR for that data set. Upon request, clients may be provided visualizations of at least parts of the HCR and/or the ASTR generated in (or even during) the pre-compute phase in some embodiments, e.g. with visual cues such as icon sizes or colors being employed in the visualizations to show properties of the identified clusters (such as how closely the entities of a particular cluster resemble each other). Clients may obtain various types of metrics pertaining to the identified clusters in different embodiments via the programmatic interfaces 177.

Pre-Compute Versus Run-Time Clustering Phases

Figure 2:
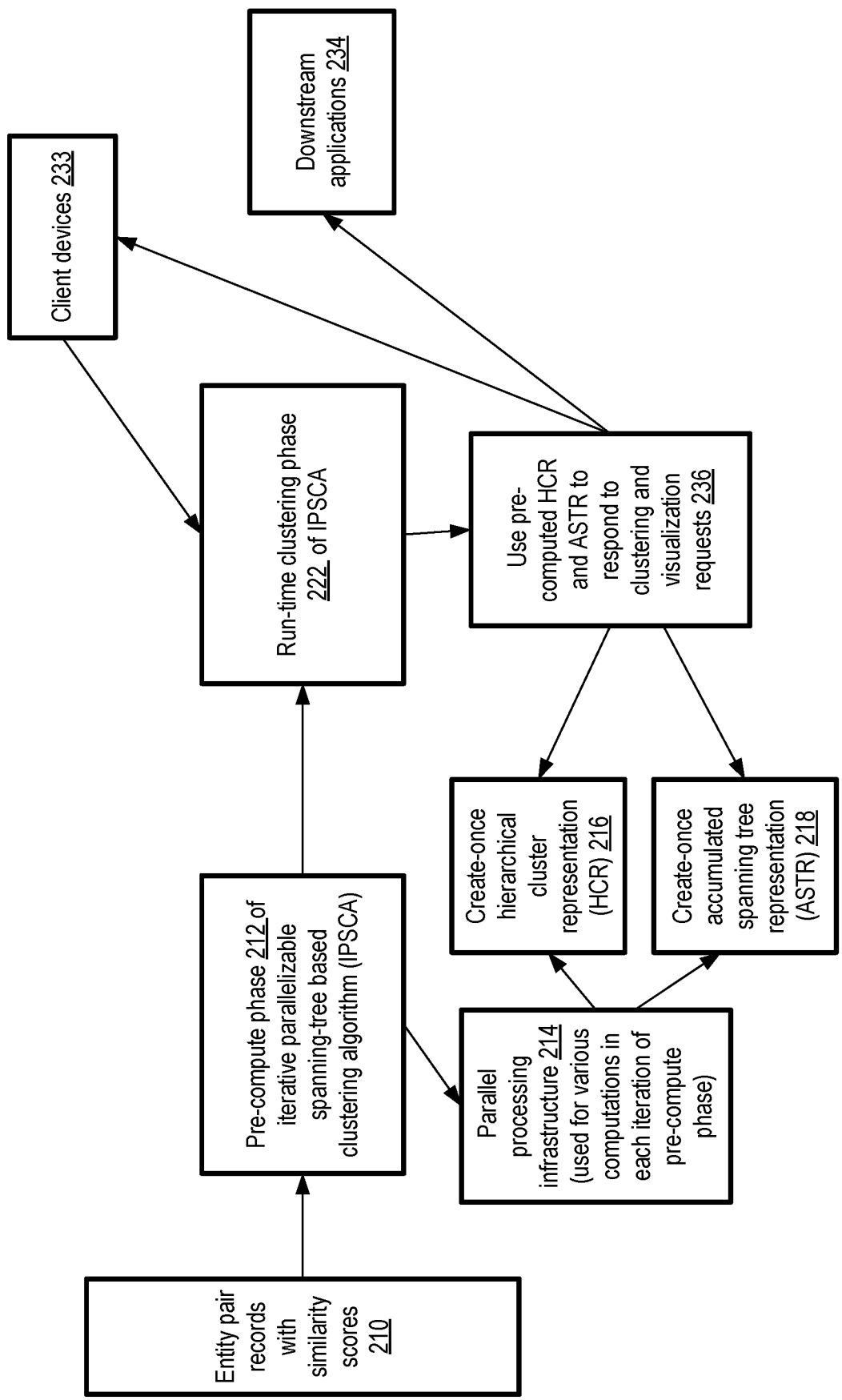
FIG. 2 illustrates aspects of a pre-compute phase and a run-time clustering phase of a scalable spanning-tree based clustering algorithm, according to at least some embodiments.

FIG. 2 illustrates aspects of a pre-compute phase and a run-time clustering phase of a scalable spanning-tree based clustering algorithm, according to at least some embodiments. As shown, a set of entity pair records 210, with each record indicating a pair of entities and a similarity score computed for the pair, may be provided as input to the pre-compute phase of an iterative parallelizable spanning tree-based clustering algorithm in the depicted embodiment. The pre-compute phase 212 may comprise a plurality of iterations in at least some embodiments, with each iteration corresponding to a respective similarity threshold to be used to group the entities into clusters. In at least some embodiments, multiple servers of a parallel processing infrastructure 214 (e.g., a parallel processing service of a provider network or cloud computing environment) may be employed for any of several different types of computations performed during the pre-compute phase iterations. For example, a parallel version of a connected components algorithm may be executed on multiple servers to generate clusters from a subset of entity pairs of the input of an iteration, a parallel version of a Kruskal algorithm may be used to generate spanning trees from the identified clusters, and/or a parallel version of an inter-cluster (or inter-spanning-tree) edge reduction algorithm may be employed to help generate the input for a subsequent iteration in various embodiments.

A pair of transformed representations of the input entity pair records 210 may be generated, once for a given data set, during the pre-compute phase 212 in various embodiments. A create-once hierarchical cluster representation (HCR) 216 may include entries for a hierarchy of representative nodes identified for the spanning trees in the depicted embodiment, with different levels of the hierarchy corresponding to different levels of inter-cluster similarity. A create-once accumulated spanning tree representation (ASTR) may include nodes representing all the entities represented in the input entity pair records, but with fewer edges than the total number of input entity pair records, thus enabling the input data set to be visualized and explored more easily, and also reducing the overall amount of computation required to generate the HCRs. The HCR 216 and the ASTR 218 may be referred to as "create-once" in the depicted embodiment because they do not have to be re-created to respond to client clustering requests with differing requirements (e.g., different intra-cluster similarity thresholds, or different visualization requests); instead, the HCR and the ASTR may be used to respond to numerous different requests.

In the run-time clustering phase 222 of the IPSCA, the pre-computed HCR and/or ISTR may be used (as indicated in element 236) to respond to requests submitted from client devices 233 in the depicted embodiment, including for example clustering requests indicating targeted properties of clusters, metrics requests, visualization requests, and so on. The responses to the client requests may be sent back to the client devices 233 and/or provided to one or more downstream applications 234. In some embodiments, portions or all of the HCR 216 and/or the ASTR 218 corresponding to a given data set may be sent to downstream applications 234 and/or to client devices 233.

Methods for Scalable Hierarchical Clustering

Figure 3:
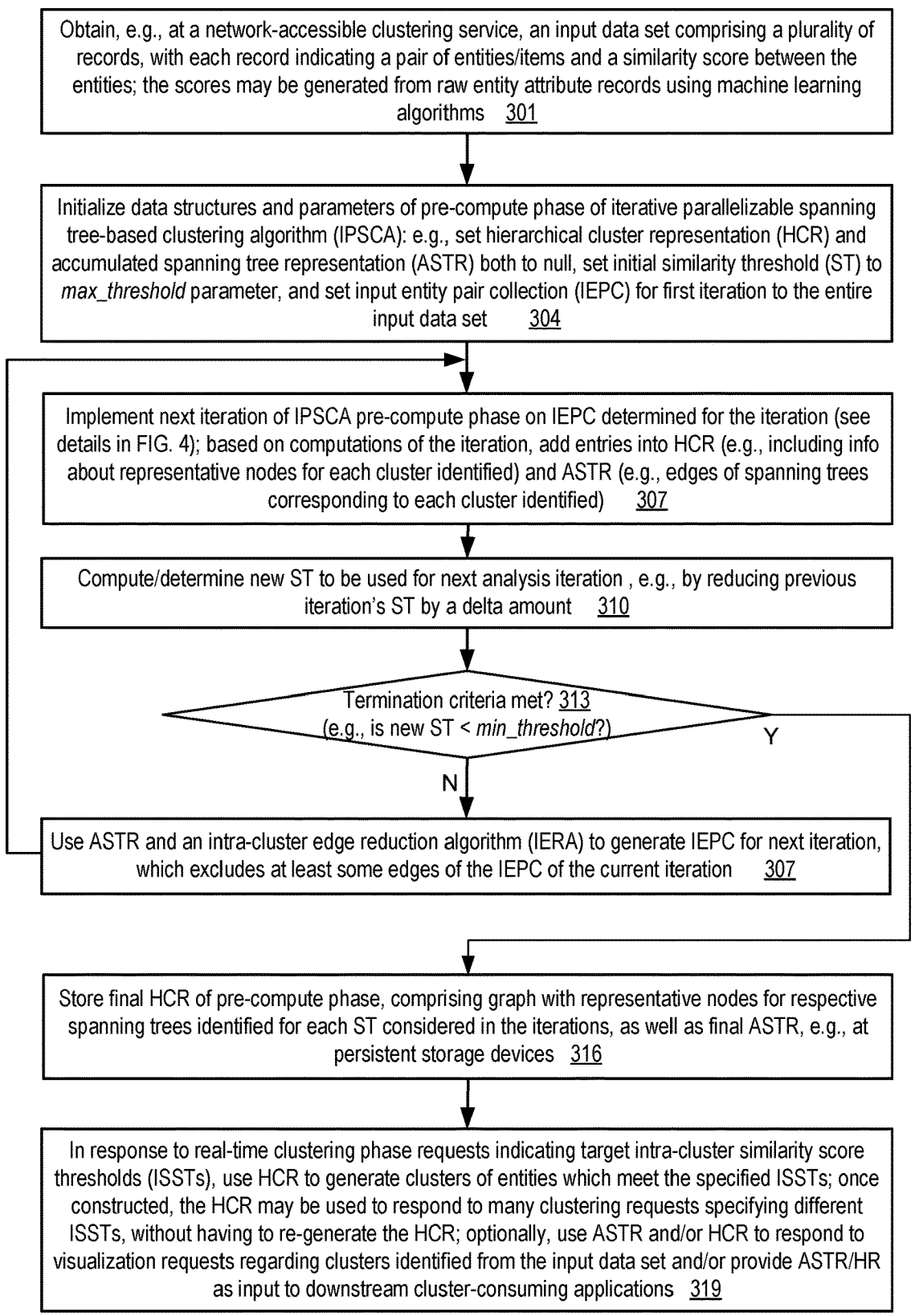
FIG. 3 is a flow diagram illustrating an overview of an iterative spanning-tree based clustering algorithm, according to at least some embodiments.

FIG. 3 is a flow diagram illustrating an overview of an iterative spanning-tree based clustering algorithm, according to at least some embodiments. As shown in element 301, an indication of an input data set on which clustering analysis is to be performed may be obtained, e.g., via one or more programmatic interfaces at a network-accessible clustering service. The input data set may comprise a plurality of records, with each record indicating a pair of entities and a similarity score between the entities. In some embodiments, the similarity scores may be obtained using one or more machine learning algorithms, e.g., as part of the work done at an analytics service (of which the clustering service is a component), or at a different service.

A set of data structures and parameters of an iterative parallelizable spanning-tree based clustering algorithms (IPSCA) may be initialized in various embodiments (element 304). For example, a data structure to be used for a hierarchical cluster representation (HCR) of the input data set, and a data structure to be used for an accumulated spanning tree representation (HCR) of the input data set may both be set to null. Note that in some cases, the HCR and/or the ASTR may be implemented as distributed data structures, spread over a plurality of storage devices at a plurality of data stores. In the graphical analysis used to generate the HCR and the ASTR, entities may be represented by respective graph nodes, and entity pairs (with associated similarity scores) by edges; as such, the term edge may be used to refer to entity pairs and the term node may be used to refer to entities in at least some embodiments. An initial similarity threshold (ST) value, to be used for the first iteration of a pre-compute phase of the IPSCA may be set to a max_threshold parameter of the IPSCA; as iterations proceed, the threshold may be reduced for each successive iteration by a delta amount (which may another parameter of the IPSCA) until eventually a minimum threshold value (min_threshold) is reached in some iteration and the pre-compute phase of the IPSCA is terminated. An input entity pair collection (IEPC) for the first iteration may be set to the entire input data set in the depicted embodiment. In some embodiments, one or more IPSCA parameters such as max_threshold, min_threshold and delta may be specified programmatically by a client of a clustering service. In other embodiments, the clustering service may select the values of the parameters without specific client input, e.g., based on knowledge base entries or heuristics learned over many different clustering efforts.

A number of iterations of the pre-compute phase may then be implemented, starting with operations corresponding to element 307 of FIG. 3 on the IEPC determined for the iteration (the IEPC may change from iteration to iteration). Details regarding the specific types of computations performed are provided below, e.g., via pseudo-code set PS1, FIG. 4, and various examples using small data sets. Based on the computations performed, in at least some iterations, one or more entries may be added to the HCR (e.g., including records containing information about representative nodes of each cluster identified) and/or the ASTR (e.g., edges of spanning trees corresponding to each cluster which is identified).

A new similarity score (ST) for the next iteration may be computed (element 310), e.g., by subtracting a delta amount from the current iteration's ST value. If one or more termination criteria for the pre-compute phase are not met (as determined in operations corresponding to element 313), the ASTR and an inter-cluster edge reduction algorithm (IERA) may be used to generate the IEPC (the input data set) for the next iteration in the depicted embodiment. The inter-cluster edge reduction algorithm may also be referred to as an inter-spanning-tree edge reduction algorithm, as the clusters may be represented by their respective spanning trees at the time that the edge-reduction algorithm is implemented. In some embodiments, the edge reduction algorithm may also be referred to as a cluster compression algorithm. Operations corresponding to elements 307 onwards may be repeated for the next iteration. In at least some iterations (except the final iteration), one or more edges represented in the IEPC for that iteration may be eliminated from the IEPC for the next iteration; as such, the IEPC for an iteration (K+1) may not contain at least some of the edges corresponding to the IEPC for iteration (K) in such embodiments. Note that this does not mean that the total number of edges from which clusters and spanning trees are generated in iteration (K+1) is necessarily smaller than the total number of edges from which clusters and spanning trees are generated in iteration (K); as discussed below, a subset of edges derived from the IEPC based on the value of ST may be analyzed to generate such clusters and spanning trees, and the reduced value of ST may result in more edges being analyzed in iteration (K+1) than in iteration (K).

If one or more termination criteria for the pre-compute phase are met (as also determined in operations corresponding to element 313), the final versions of the HCR and ASTR of the pre-compute phase (i.e., the HCR and ASTR as of the end of the final pre-compute phase iteration) may be stored at persistent storage devices in the depicted embodiment, if they are not already being stored at such devices (element 316). The real-time clustering phase of the IPSCA may now begin in the depicted embodiment. IN response to various types of requests received programmatically in the real-time clustering phase, the HCR and the ASTR may be used to prepare and provide corresponding responses (element 319). For example, a real-time request for clusters with a target minimum intra-cluster similarity score threshold (ISST) may be received in one embodiment, and the HCR may be used to identify representative nodes of clusters such that the similarity score between any pair of nodes in a given cluster may be at least equal to the specified target ISST. Other types of intra-cluster similarity criteria, such as a range rather than a minimum threshold, may be specified in some embodiments. The pre-computed HCR may be used to respond to requests with different ISSTs in the depicted embodiment, without ever having to re-generate the HCR, as it contains information about clusters and spanning trees corresponding to different iteration-specific similarity thresholds. The HCR and/or the ASTR may be used to provide visualizations of at least portions of the input data set in some embodiments. In at least one embodiment, portions or all of the HCR and/or the ASTR may be provided to downstream cluster-consuming applications, where such applications may use the HCR and/or the ASTR to obtain clusters with various targeted properties as needed.

High level pseudo-code set PS1 for one example implementation of the iterative algorithm used in the pre-compute phase is provided below. In various embodiments, the actual software code for the algorithm may be written in any desired programming language, such as Scala, Python, Java™, C, C++ or the like. The parameters maxSimilarityScore and minSimilarityScore in lines 6 and 7 of PS1 correspond to the parameters max_threshold and min_threshold discussed above in the context of FIG. 3. The variable currentThreshold (introduced in line 15) corresponds to the current iteration's similarity threshold value ST of FIG. 3. The while loop starting at line 17 and ending at line 45 represents the per-iteration computations, of which further details are provided in the context of FIG. 4. The checking of the termination criteria discussed in the context of FIG. 3 corresponds to line 38 of PS1.

---Start pseudo-code set PS1 for pre-compute phase---
1: #inputs include: the entity pairs of the data set,
2: #the maximum similarity score threshold (used in the first iteration)
3: #the minimum similarity score threshold (used to terminate iterations), and
4: #delta (the amount by which the score is reduced for each successive iteration
5: function pre-Compute(inputEntityPairDataSet,
6: maxSimilarityScore,
7: minSimilarityScore
8: delta){
9: #Initialize accumulated spanning tree representation (ASTR)
10: #and hierarchical cluster representation (HCR):
11: ASTR=HCR=null;
12: #set remainingEdges variable to input data set
13: remainingEdges=inputEntityPairsCollection; //IEPC
14: #set current threshold to maximum similarity score
15: currentThreshold=maxSimilarityScore; //ST
16: #start iterations
17: while (true) do
18: #initialize iteration's spanning tree records
19: spanningTreeRecords=null;
20: #make sure there are some edges (entity pairs) in the input for this iteration
21: if (remainingEdges.count>0) {
22: #select subset of entity pairs which meet iteration's threshold
23:    selectedEdges=remainingEdges.filter(currentThreshold);
24: if (selectedEdges.count>0) {
25: #get clusters from edges, e.g., using multiple servers in parallel
26: clusters=GetConnectedComponents(selectedEdges);
27: #generate spanning trees for each cluster, e.g., using multiple servers in parallel
28: spanningTreeRecords=GetSpanningTrees (clusters);
29: #accumulate spanning tree info into ASTR and HCR
30: accumulateEdges(ASTR, spanningTreeRecords);
31: addRepresentativeNodesInfo(HCR,
32: spanningTreeRecords);
33: }//endif selectedEdges.count>0
34: }//endif remainingEdges.count>0
35: #reduce threshold for next iteration by delta; exit if minimum similarity threshold
36: #is reached
37: currentThreshold=currentThreshold−delta;
38: if (currentThreshold<=minSimilarityScore) break; //exit while
39: else {
40: #if there will be another iteration, generate input for next iteration
41: #by compressing clusters, e.g., reducing inter-cluster edges
42: remainingEdges=compressClusters(remainingEdges,
43: spanningTreeRecords);
44: }//end if
45: }//end while
---End pseudo-code set PS1 for pre-compute phase---

Figure 4:
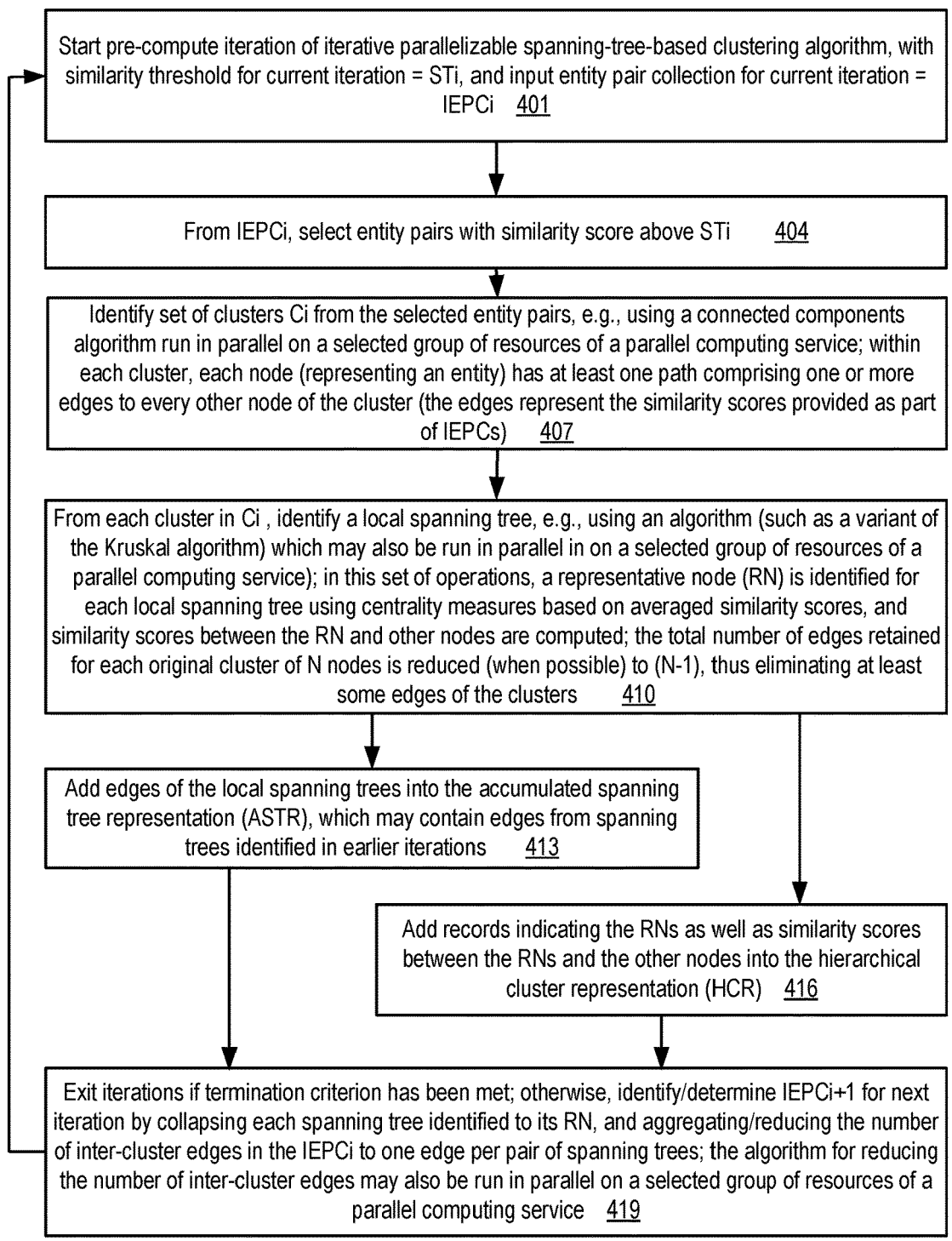
FIG. 4 is a flow diagram illustrating aspects of operations which may be performed in a pre-compute phase iteration of a spanning-tree based clustering algorithm, according to at least some embodiments.

FIG. 4 is a flow diagram illustrating aspects of operations which may be performed in a pre-compute phase iteration of a spanning-tree based clustering algorithm, according to at least some embodiments. In operations corresponding to element 401, the iteration may be started, with the similarity threshold for the iteration having been set to STi (where the index i represents the iteration count), and the input entity pair collection (IEPC) being set to IEPCi. In pseudo-code set PS1, the variable currentThreshold corresponds to ST, and the variable remainingEdges corresponds to the IEPC.

At the start of each iteration, a variable spanningTreeRecords of PS1 may be initialized to null (line 19). Assuming that IEPCi is not empty (as checked at line 21 of PS1), the following computations may be performed on IEPCi in various embodiments. From IEPCi, a subset of entity pairs with similarity scores above STi may be selected (element 404 of FIG. 4), in operations corresponding to line 23 of PS1.

A set of clusters Ci may then be generated or identified from the selected subset of entity pairs (element 407 of FIG. 4, and line 26 of SP1) in at least some embodiments, assuming that the selected subset is not empty (as checked in line 24 of SP1). A parallel version of a connected components algorithm may be employed in some embodiments to identify the clusters, e.g., using several servers of a parallel computing service concurrently; other algorithms for cluster identification may be used in other embodiments. With each identified cluster, each node (representing a respective entity) may have at least one path comprising one or more edges to every other node of the cluster (the edges may represent the similarity scores for pairs of entities of the cluster).

From each cluster in Ci, a local spanning tree may be identified in at least some embodiments (element 410 of FIG. 4, and line 28 of PS1). In one embodiment, a parallel version or variant of the Kruskal algorithm may be used to generate the spanning trees, e.g., using multiple servers of a parallel computing service. In this set of operations, a respective representative node (RN) may also be identified for each local spanning tree, e.g., using centrality measures of the kind discussed below (e.g., using mean average hop scores for each node as illustrated in FIG. 7). For those nodes of a spanning tree which are not already connected via a single hop to the RN for that spanning tree, a respective similarity score with respect to the RN may also be computed in at least some embodiments. The total number of nodes retained for each original cluster is reduced as a result of generating the spanning tree representations of the clusters: e.g., if a cluster had N nodes, it's corresponding spanning tree will have no more than N−1 edges; as such, the operation of identifying the spanning tree for a cluster results, in at least some cases, in the elimination of at least some edges of the cluster. (Of course, it could be the case that some clusters already had only N−1 edges, in which case there may not be an elimination of edges and a reduction in edge count for such clusters.)

As shown in element 413 of FIG. 4 and in line 30 of PS1, edges of the local spanning trees may be added to ASTR in at least some embodiments. As shown in element 416 and line 31, information about the RNs and their similarities with all the nodes of their respective clusters may be incorporated into the HCR in various embodiments. The operations to add entries into the ASTR and the HCR may also be performed in parallel in at least some embodiments. If the termination criterion for the pre-compute phase has been met (as determined in lines 37 and 38 of PS1), no more iterations may be required. Otherwise, the next iteration's input edge pair collection (IEPCi+1) may be determined in various embodiments, e.g., by collapsing each of the spanning trees to its RN and aggregating/reducing the number of inter-cluster (or inter-spanning-tree) edges that were present in IEPCi to one edge per pair of spanning trees (element 419 of FIG. 4, lines 42-43 of PS1). The operations to generate the next iteration's input (IEPCi+1) and reduce the inter-cluster edges may also be performed in parallel in some implementations at a plurality of servers, e.g., using resources of a parallel computing service.

Example of Analysis Iteration on Small Data Set

Figure 5A:
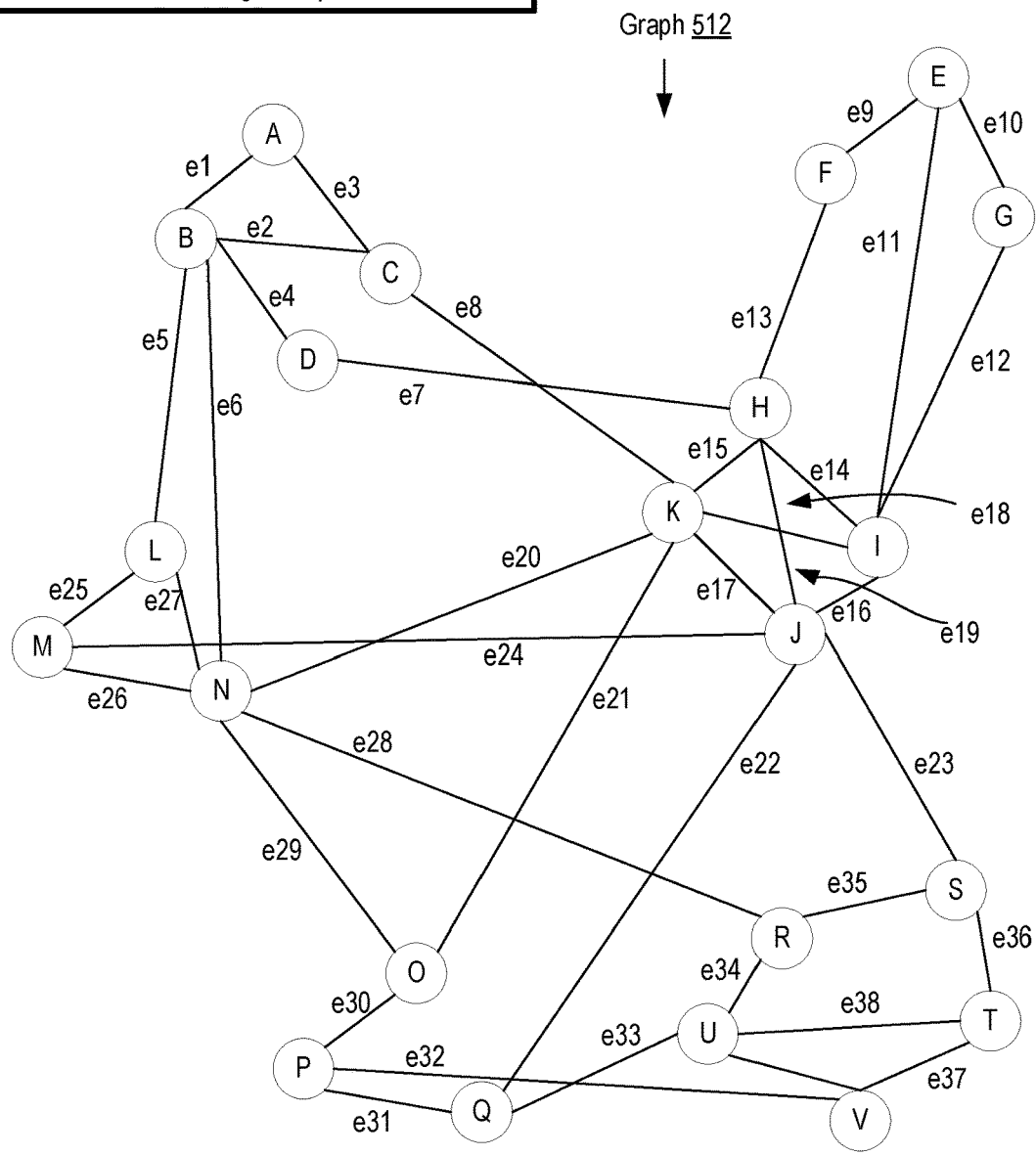
FIG. 5a-FIG. 5e collectively illustrate operations which may be performed on a small example data set during a particular iteration of a spanning-tree based clustering algorithm, according to at least some embodiments.

Some of the computations discussed in the context of FIG. 4 may be better understood with the help of a small example. FIG. 5a-FIG. 5e collectively illustrate operations which may be performed on a small example data set during a particular iteration of a spanning-tree based clustering algorithm, according to at least some embodiments. FIG. 5a shows an IEPC 510 and a corresponding initial graph 512 which could be constructed from the IEPC; note that at the start of the iteration, only information about edge pairs may be available, so the graph 512 may not actually have been constructed. Instead, as illustrated below, clusters comprising portions of graph 512 may be constructed as part of the algorithm's computations. As such, graph 512 is simply meant to illustrate that the IEPC 510 contains entity pairs which could be used to construct edges e1-e38 of a graph connecting nodes A-V in the depicted example scenario.

Figure 5B:
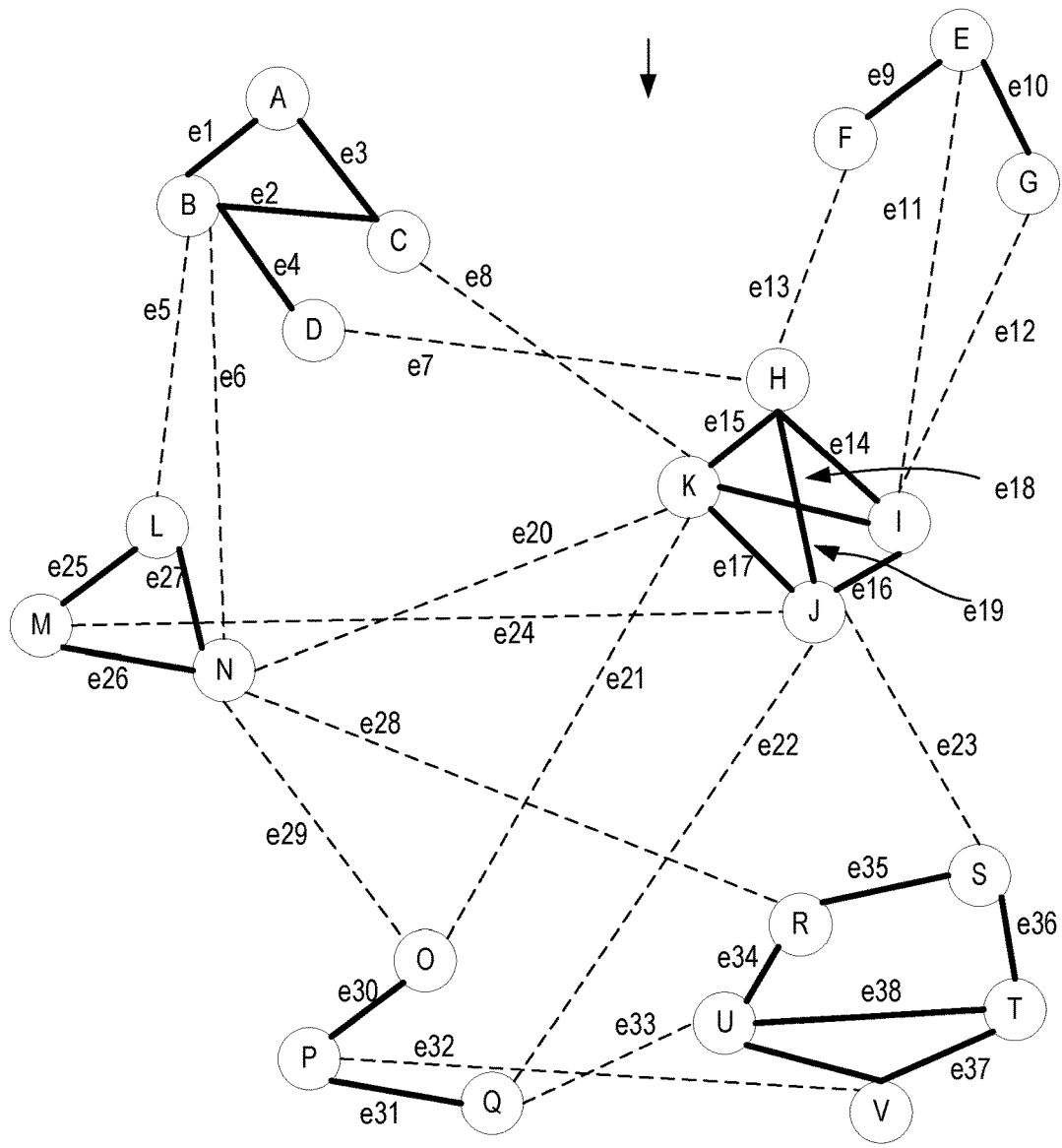

In the scenario depicted in FIG. 5b, a subset of the IEPC edges which satisfy a threshold criterion for the iteration being considered has been filtered or selected (e.g., as per operations corresponding to element 404 of FIG. 4). The thick edges 514 (e.g., e1, e2, e3, e9, e10, etc.) meet the iteration's threshold criterion; remaining edges (such as e5, e6, e20, e24, etc.) which do not meet the criterion are shown as dashed lines in FIG. 5b.

Figure 5C:
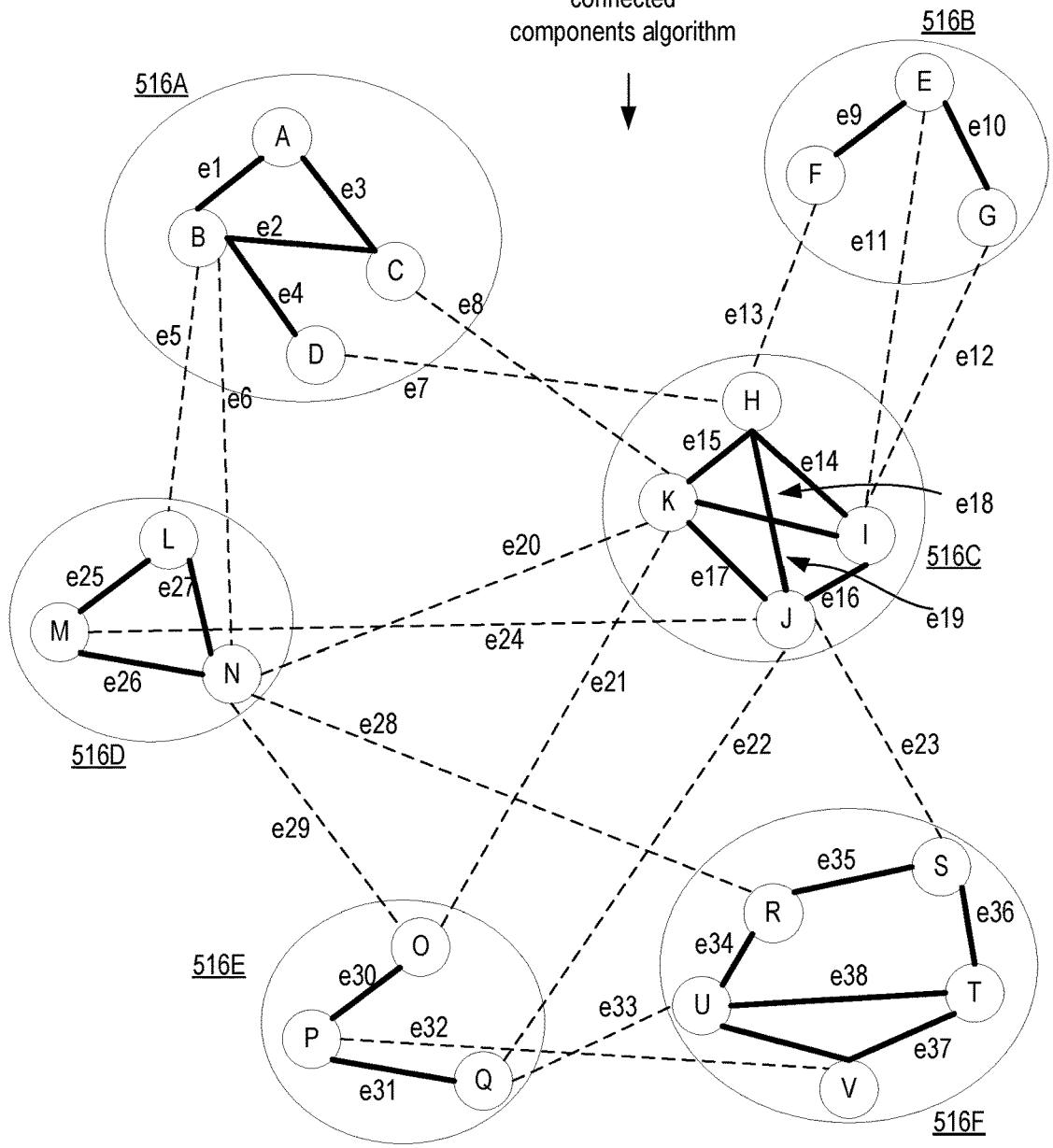

In the scenario depicted in FIG. 5c, a set of clusters 516 (e.g., 516A, 516B, 516C, 516D, 516E and 516F) are identified from the selected edges shown in FIG. 5b, e.g., using operations corresponding to element 407 of FIG. 4. Any of a variety of different algorithms may be employed to identify the clusters 516 in different embodiments, such as a parallelized connected components algorithm run across several different servers.

Figure 5D:
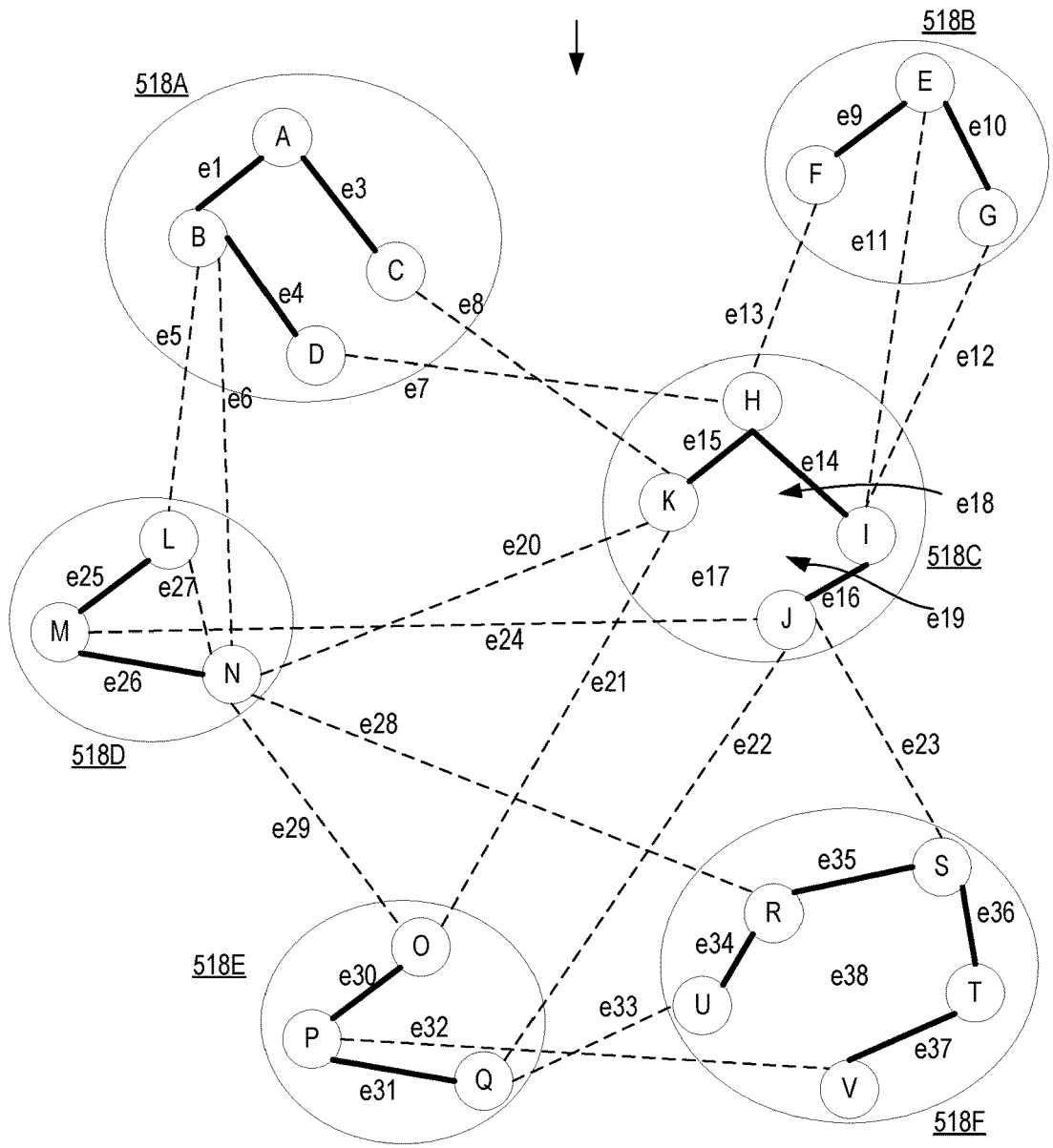

FIG. 5d shows a set of spanning trees 518 identified from respective clusters 516 using some of the operations corresponding to element 410 of FIG. 4—e.g., spanning tree 518A is generated from cluster 418A, spanning tree 518B is generated from cluster 418B, and so on. Note that at least in some cases, the total number of edges in a spanning tree may be smaller than the total number of edges in the corresponding original cluster: thus, for example, cluster 516A had 4 edges but spanning tree 518A has 3 edges, and cluster 516C had 6 edges whereas spanning tree 518B has 3 edges. As shown, a spanning for a cluster with N nodes has N−1 edges, and retains all N nodes. Any of a variety of spanning tree generation algorithms may be employed in different embodiments, such as a parallel variant of the Kruskal algorithm. Edges of the spanning trees 518 may be added to the ASTR in various embodiments, using operations corresponding to element 413 of FIG. 4.

Figure 5E:
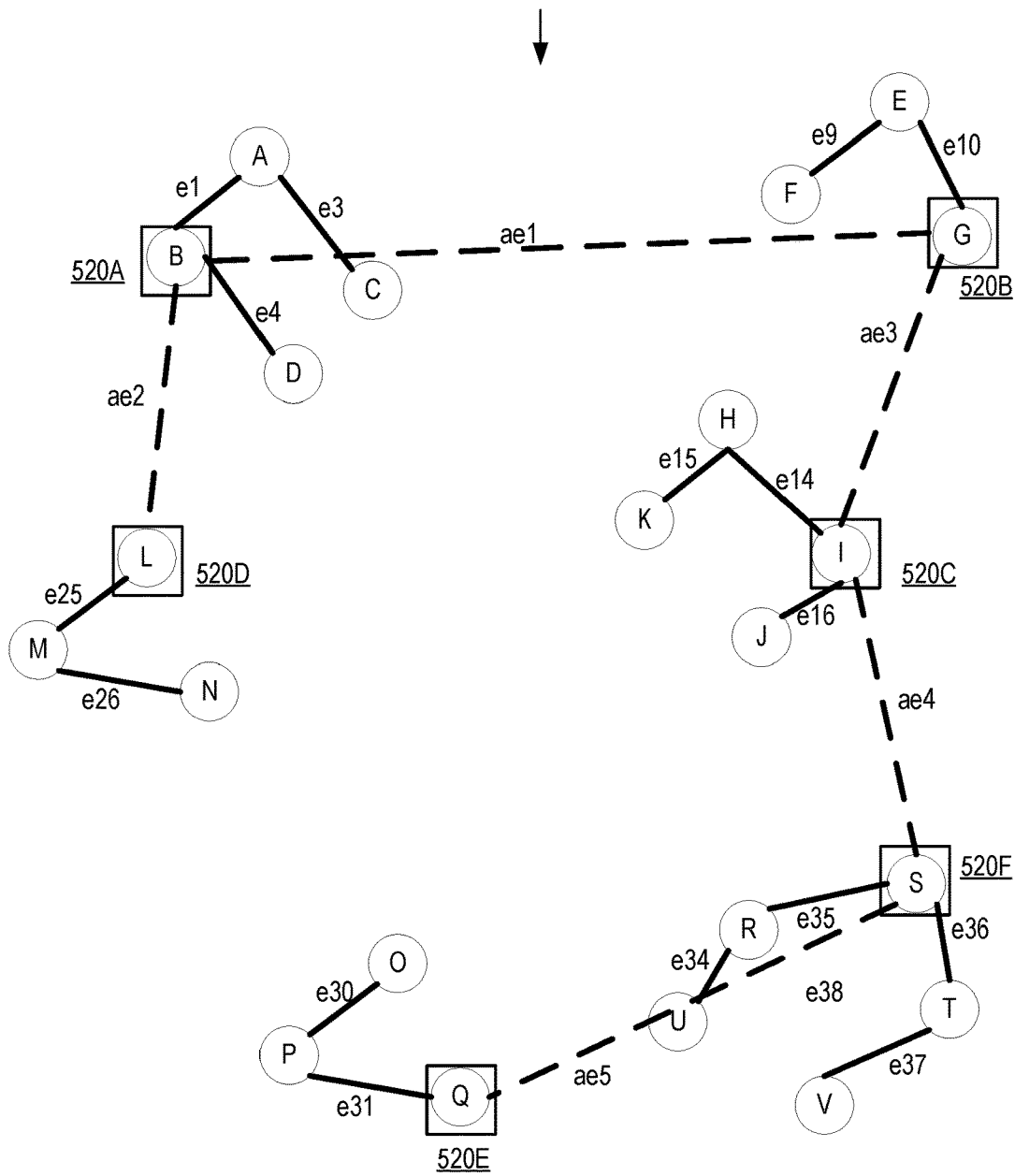

FIG. 5e shows respective representative nodes (RNs) 520 identified for each of the clusters 518 of FIG. 5d, e.g., using other operations corresponding to element 410 of FIG. 4. The RN for a given cluster or spanning tree may be selected from among the nodes of that cluster or spanning tree based on centrality criteria in various embodiments, e.g., using aggregated metrics of similarity between each node and every other node, as discussed below in the context of FIG. 7. RNs are shown using circles within squares in FIG. 5e. Node B is identified as the RN for spanning tree 518A, node G is the RN for spanning tree 518B, node I is the RN for spanning tree 518C, node L is the RN for spanning tree 518D, node S is the RN for spanning tree 518F, and node Q is the RN for spanning tree 518E. Furthermore, in FIG. 5e, multiple edges between pairs of spanning trees (which existed in the original IEPC shown in FIG. 5a) have been replaced by a single edge connecting the RNs for that pair of spanning trees, using operations corresponding to element 419 of FIG. 4. Thus, for example, edges e7 and e8 shown in FIG. 5a-5c have been replaced by aggregated edge ae1 linking RNs B and G, edges e5 and e6 have been replaced by aggregated edge ae2, and so on. Entries representing the RNs and associated information (e.g., new one-hop similarity scores computed for each node which previously was linked to the RN via a path with more than one edge) may be added to the HCR in various embodiments, e.g., using operations corresponding to element 416 of FIG. 4.

Example Visualization of Hierarchical Cluster Representation

Figure 6:
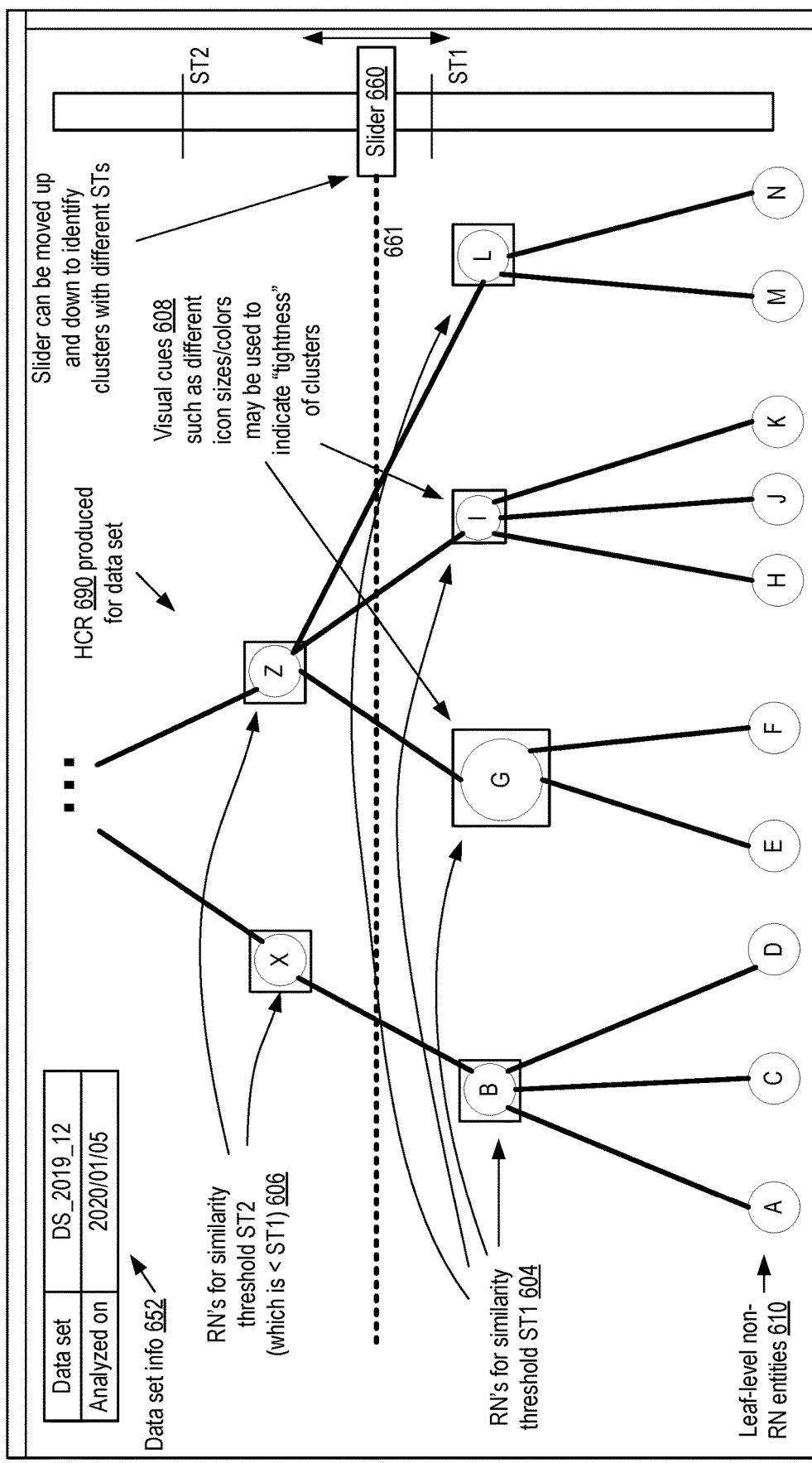
FIG. 6 illustrates an example graphical interface which may be utilized to display representations of clusters generated using a spanning-tree based clustering algorithm, according to at least some embodiments.

FIG. 6 illustrates an example graphical interface which may be utilized to display representations of clusters generated using a spanning-tree based clustering algorithm, according to at least some embodiments. As shown, graphical interface 650 includes information 652 identifying a particular data set ("DS_2019_12" in the example provided in FIG. 6) and provides an indication of when the data set was analyzed using an iterative parallelizable spanning-tree based algorithm (IPSCA) of the kind introduced in FIG. 1.

In the depicted embodiment, a view of hierarchical cluster representation (HCR) 690 produced from the data set may be shown in the form of a tree, e.g., in response to a visualization request from a client of an analytics service. The leaf-level nodes of the tree 610, such as nodes A, C, D, E, F, H, J, K, M and N represent entities which were not identified as representative nodes (RNs) in the pre-compute phase of the IPSCA. Nodes at higher levels of the tree represent RNs identified during respective iterations for different similarity thresholds, with the similarity thresholds decreasing as one traverses away from the leaf nodes. Thus, for example, nodes B, G, I and L represent respective RNs 604 for four different clusters with similarity threshold ST1. Nodes B, A, C and D belong to one cluster identified in an iteration using ST1 as the similarity threshold; nodes G, E, and F belong to another cluster with similarity threshold ST1; nodes I, H, J and K belong to a third such cluster, and nodes L, M and N belong to the fourth such cluster. Nodes X and Z represent RNs 606 for a lower similarity threshold ST2; the cluster with node X as the RN includes the nodes of the cluster for which node B is the RN.

In order to enable clients to view the set of clusters corresponding to different similarity thresholds, a slider interface 660 may be included in a graphical interface similar to interface 650 in some embodiments. The slider may be moved up and down along a scale with different similarity thresholds (such as ST1 and ST2), and the set of RNs that fall below the horizontal line 661 corresponding to the slider would indicate the clusters identified for the desired similarity threshold.

According to at least one embodiment, one or more types of additional visual cues 608 about the properties of the identified clusters may be provided via a graphical interface similar to interface 650. For example, icons of different sizes, colors, or shades may be used for the RNs to show the extent of centrality of the RNs at a given level of the HCR—that is, the extent of the similarity of the RN to all the other nodes of its cluster may be indicated. This property may also be referred to as the "tightness" of the clusters represented by the RNs. In one implementation, for example, if a larger icon is used for node G than for node I, this may indicate that the average similarity of node G to the other nodes of its cluster (nodes E and F) is greater than the average similarity of node I to the other nodes in its cluster (nodes H, J and K). Such visual cues may make it easier for viewers (e.g., clients of an analytics service on whose behalf the HCR was generated) to understand the distribution of properties of the entities of the input data set. In some embodiments, graphical interfaces similar to 650 may also or instead be used to show the accumulated spanning tree representation (ASTR) generated from an input data set.

Example Computations to Identify Representative Nodes

As discussed above, as part of the pre-compute phase of an iterative parallelizable spanning-tree based algorithm (IPSCA) of the kind introduced in FIG. 1, representative nodes for each of the spanning trees corresponding to the clusters identified during a given iteration may be determined. FIG. 7 illustrates example operations that may be performed to identify a representative node from a cluster, according to at least some embodiments. Cluster 702, which may have been identified using a connected components algorithm or the equivalent, comprises nodes A, B, C, D, E and F. The similarity scores for each of the edges of cluster 702, assumed to be real numbers between 0 and 1 in the example of FIG. 7, are also shown—e.g., the similarity score for the entity pair represented by nodes B and C is 0.2, the similarity score for nodes A and C is 0.2, and so on.

In the implementation whose computations are shown in FIG. 7, the similarity scores are first converted to weights by subtracting each of the similarity scores from 1. Thus, because the similarity score for the node pair (B, C) is 0.2, the weight for (B, C) is (1-0.2) or 0.8. The weights are used to find shortest paths between each pair of nodes of the cluster, as indicated in element 710. For example, the shortest path (the path with the minimum total weight for all the edges of the path) between A and B is A-C-B, the shortest path between B and D is B-C-A-D, and so on.

Using the similarity scores (not the weights) and the number of edges of each shortest path, the average hop score for each shortest path is then obtained in the depicted embodiment (element 715). The average hop score, which may also be referred to as an intermediary metric of similarity, is computed as the sum of the similarity scores for the shortest path, divided by the number of edges in the shortest path. Thus, for example, the average hop score for the shortest path between B and D is (0.1 (the score for (B, C)+0.2 (the score for (C, A)+0.5 (the score for (A, D))/3=0.3.

Using the average hop scores for all the shortest paths from a given node, a centrality metric of the node, referred to as the mean average hop score, may then be obtained (element 720) in the depicted embodiment. The centrality metric may thus represent a statistical aggregate of the intermediary similarity metrics in the depicted embodiment. In effect, the mean average hop score indicates, for a given node, how similar that particular node is to all of the other nodes of the cluster. The node with the highest centrality metrics (the highest mean average hop score in the example shown) may then be selected as the representative node for the cluster (element 725). It is noted that in some embodiments, techniques other than that illustrated in FIG. 7 may be used to compute centrality metrics and/or representative nodes.

Example Computations to Reduce Inter-Cluster Edges

Figure 8A:
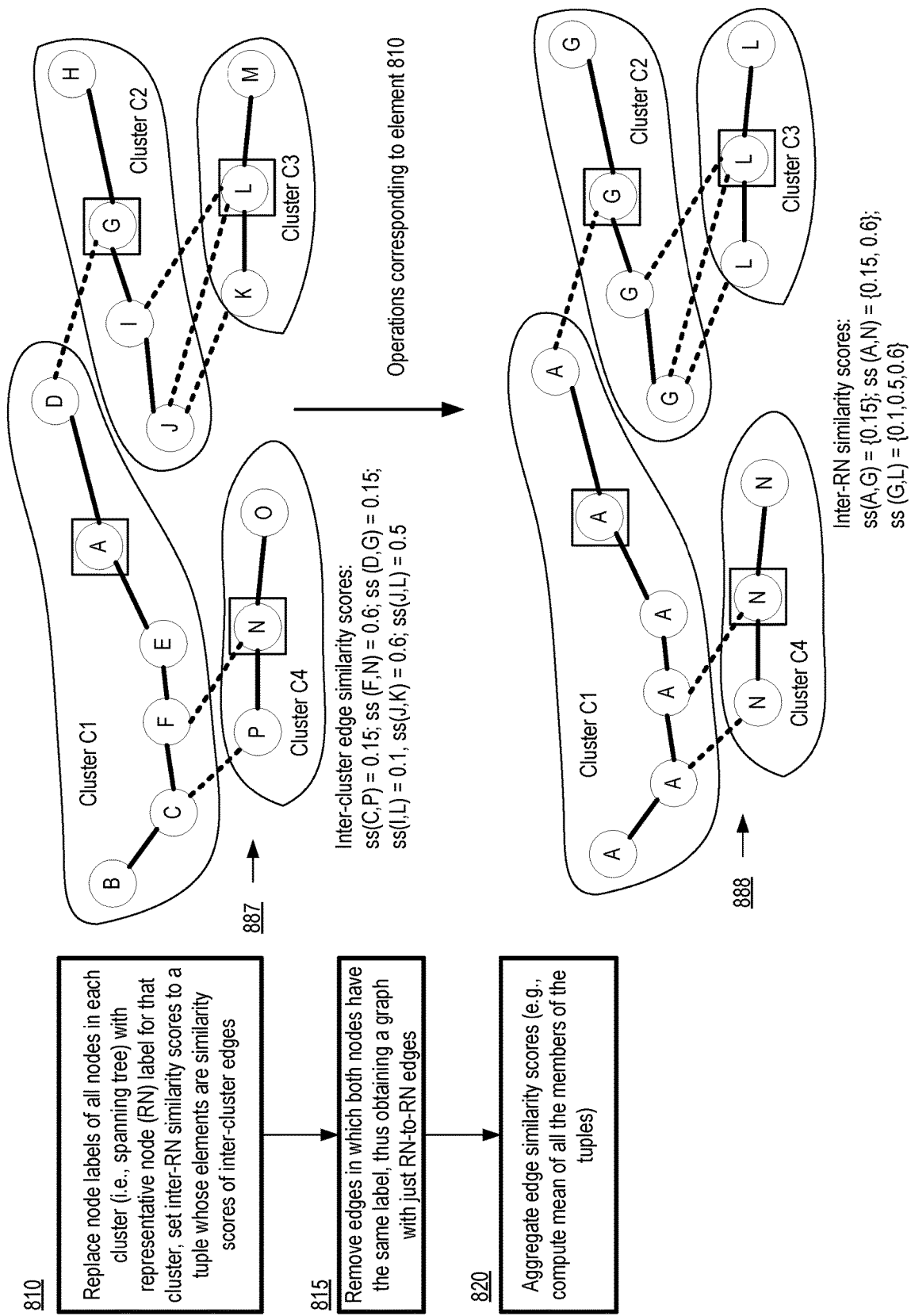

As discussed above, in at least some embodiments, the pre-compute phase of an iterative parallelizable spanning-tree based algorithm (IPSCA) of the kind introduced in FIG. 1, may include operations to reduce the number of inter-cluster edges, e.g., as part of the identification of the input edge pair collection (IEPC) for a subsequent iteration. FIG. 8a and FIG. 8b collectively illustrate example operations that may be performed to reduce the number of inter-cluster edges, according to at least some embodiments.

In the depicted example, four clusters (and their corresponding spanning trees) of graph 887 have been identified for a data set during a particular iteration of the IPSCA pre-compute phase: clusters C1, C2, C3 and C4. C1 comprises nodes A-F, with node A having been identified (e.g., using operations similar to those shown in FIG. 7) as the representative node or RN. C2 comprises nodes H-J, with G chosen as the RN. C3 comprises nodes K, L and M, with L as the RN, while C4 comprises nodes N, O and P, with N as the RN. Similarity score values for the inter-cluster edges (which were present in the IEPC for the current iteration) are also shown: e.g., the similarity score for the C-P edge is 0.15, the similarity score for the I-L edge is 0.1, and so on.

In the implementation whose computations are illustrated in FIG. 8a and FIG. 8b, the node labels for cluster's nodes are first replaced by the label of the cluster's RN (element 810) in the edge-reduction algorithm. In addition, the similarity scores between the RNs of the different clusters are set to a tuple whose elements are the similarity scores of the corresponding inter-cluster edges. Thus, for example, in version 888 of the graph 887 obtained after operations corresponding to element 810 have been performed, all the nodes of C1 have been labeled "A" (because A was the RN for C1), and the similarity score between nodes A and N (the RN of cluster C4) has been set to the tuple {0.15, 0.6} because the similarity score between nodes C and P was 0.15 and the similarity score between nodes F and N was 0.6.

Then, all edges of the graph in which both nodes have the same label may be eliminated (element 815), as illustrated in FIG. 8b. This results in graph 889, which contains just one node for each of the four clusters C1-C4. The similarity scores of the edges of graph 889 may then be aggregated (element 820) from the tuples which were generated in operations corresponding to element 810, e.g., by computing the average similarity score for each tuple (the sum of the tuple's elements, divided by the number of elements), resulting in the graph 890. The edges of graph 890 may be used to generate the input edge pair collection for the next iteration of the pre-compute phase of the IPSCA. The technique of aggregating inter-cluster similarity scores, instead of simply retaining all the inter-cluster edges in the input for the next iteration, represents one use of collective intelligence in the IPSCA. In contrast to some other algorithms, in which individual outlier similarity scores may end up being used to generate clusters from groups of largely less-similar entities, the IPSCA implementation whose computations are illustrated in FIG. 8a and FIG. 8b would tend to avoid relying on outlier scores by taking all the inter-cluster edges into account.

Example Metrics

FIG. 9 illustrates example clustering relating metrics which may be generated and presented for various data sets, according to at least some embodiments. Example metrics 910 which may be obtained and provided to clients with respect to at least some data sets at an analytics service similar in features and functionality to analytics service 102 of FIG. 1 may include reduction rate 910, precision 915, large cluster count/percentage 920, maximum cluster size 925, average cluster size 930 and average multi-node cluster size 935 in the depicted embodiment.

With respect to an input data set which contains similarity scores associated with N entities, the reduction rate 910 (for a given similarity threshold and/or for a given precision) may be defined as the ratio of the number of clusters (or, equivalently, the number of spanning trees) identified in the data set, divided by the total number of entities N. At least some clients may prefer low values of reduction rate, as the lower the reduction rate, the greater the extent to which duplicate or near-duplicate entries have been identified in the data set. In some embodiments, the inverse of the reduction rate (N/(number of clusters identified)), called the compression rate, may be computed and provided to clients instead of or in addition to the reduction rate.

Precision 915 is a measure of how well the clustering algorithm was able to identify matching entities in the input data set; this may also be referred to as "purity" of the clusters. For example, in a scenario in which information about true matches among the entities is known (e.g., it is known whether an entity A is actually a duplicate of entity B) or is obtained from human auditors, the precision may be computed as the ratio of the count of actual matching pairs in a given cluster, to the total number of pairs in the cluster. The average precision may then be computed for all the clusters. Some clients of an analytics service may indicate that high precision values are important. Note, however, that there may be trade-offs between precision and reduction rate—increasing precision may result in higher reduction rates (lower compression rates) and vice versa. When comparing two clustering algorithms, a client may prefer the one which is able to improve upon (at least) one of the two metrics precision and reduction rate without changing the other metric significantly.

Some clients may not want to obtain very large clusters for their data sets, as this may indicate less than optimal matching capabilities. For example, if a cluster with 1000 member entities is identified in a data set in which the extent of actual duplication is not expected to be very high, this may suggest that the algorithm being used may not be very good at detecting duplicates. A threshold to define clusters as "large" may be used to compute the large cluster percentage or large cluster count metric 920 in some embodiments, and this metric may be reported to the client. For example, any cluster with more than 200 entities or nodes may be classified as large in one implementation. Larger values of large cluster percentages 920 may also correlate with lower precision 915 in at least some embodiments.

The maximum cluster size metrics 925 may be useful in identifying whether there is some kind of anomaly in the input data or whether there is a bug in the clustering algorithm in some embodiments. If the largest cluster identified from a set of N items with a relatively low level of expected duplication is, say, greater than N/10, this may indicate to a client or a data scientist that the clustering algorithm is merging smaller clusters incorrectly.

Average cluster size (which can include clusters with just one node) 930 and/or average multi-node cluster size (which includes only those clusters with more than one node) 935 may be of interest to some clients of an analytics service, as these metrics provide an indication of the extent of duplication or similarity in the input data set. Metrics other than those indicate in FIG. 9 may be collected and provided to clients in at least some embodiments.

Target ranges of at least some of the metrics 901 for a given input data set may be provided programmatically by some clients to the analytics service, and used to select parameters and/or termination criteria for a scaling algorithm of the kind discussed above. For example, clients may indicate a preferred minimum precision and/or a preferred minimum compression rate, and these target ranges may be used to select the maximum and minimum similarity scores to be used for the iterations of the pre-compute phase.

Example Programmatic Interactions

Figure 10:
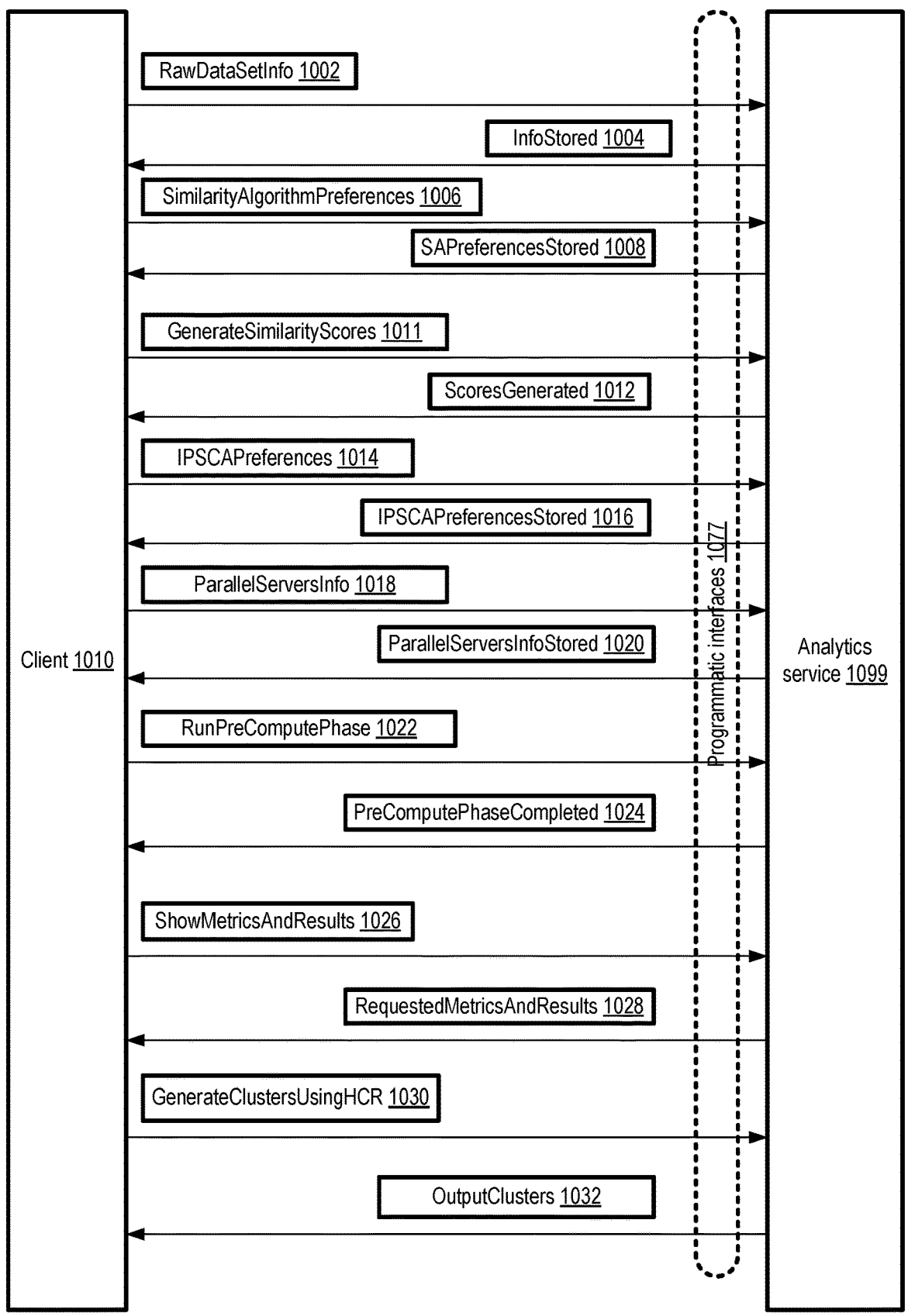
FIG. 10 illustrates example programmatic interactions between a client and an analytics service, according to at least some embodiments.

FIG. 10 illustrates example programmatic interactions between a client and an analytics service, according to at least some embodiments. As mentioned earlier, an analytics service 1099 similar in features and functionality to service 102 of FIG. 1 may implement a variety of programmatic interfaces 1077 in different embodiments, such as a set of APIs, command-line tools, graphical user interfaces, web-based consoles and the like, which can be used by clients to make requests or specify preferences pertaining to clustering-related operations to be performed on behalf of the clients.

A client 1010 may, for example, use programmatic interfaces 1077 to submit a RawDataSetInfo message 1002, indicating one or more data sources from which a set of records about entities can be obtained and used. The service 1099 may save the supplied information and respond with an InfoStored reply message 1004 in some embodiments. The client 1010 may indicate preferred machine learning algorithms to be used to generate similarity scores for pairs of entities in a SimilarityAlgorithmPreferences request 1006; such a request may also indicate preferred values of hyper-parameters for the machine learning algorithms in some cases. The information about the preferred algorithms may be stored at a repository of the analytics service in the depicted embodiment, and a SAPreferencesStored message 1008 may be sent to the client.

A GenerateSimilarityScores request 1011 may be sent to the analytics service to obtain similarity scores for at least some pairs of entities in the raw data set. In response, one or more machine learning models and/or other tools may be used to generate the similarity scores, which can then be used as part of the input entity pairs of an iterative parallelizable spanning-tree based clustering algorithm (ISPCA) similar to the algorithm introduced earlier. A ScoresGenerated message 1012 may be sent to the client 1010 to indicate that the similarity scores have been obtained in the depicted embodiment.

A client may submit an IPSCAPreferences message 1014 in the depicted embodiment, indicating the entity pair records for which the IPSCA is to be run. In some embodiments, the clients may use the message 1014 to also indicate values for one or more IPSCA parameters (e.g., the maximum similarity threshold, the minimum similarity threshold, the delta to be used to reduce thresholds from one iteration to the next, and so on.). In response, the preferences may be stored at the analytics service, and an IPSCAPreferencesStored message 1016 may be sent to the client.

In some embodiments in which multiple servers are to be used in parallel for at least some computations of the IPSCA, a ParallelServersInfo messages 1018 may be sent by the client 1010 to indicate preferences regarding parallelism—e.g., the set of computing servers available, the extent of parallelism desired, and so on may be indicated. IN response to the analytics service may store the information about the parallel servers and send a Parallel ServersInfoStored message 1020 in the depicted embodiment.

A RunPreComputePhase request 1022 may be submitted to cause the analytics service to execute the analysis iterations of the IPSCA which lead to the creation of the HCR (hierarchical clustering representation) and the ASTR (accumulated spanning tree representation) for a specified data set for which similarity scores were generated earlier in the depicted embodiment. In response, the iterations of the pre-compute phase may be executed at the analytics service, and a PreComputePhaseCompleted message 1024 may be sent to the client after the iterations are terminated. In some embodiments, values for various parameters of the pre-compute phase (including parallel computing preferences) may be indicated in the RunPreComputePhase message, e.g., instead of being specified in separate IP SCAPreferences and/or Parallel ServersInfo messages.

A number of metrics may be collected during and/or computed at the end of the pre-compute phase at the analytics service 1099 in various embodiments, such as some of the metrics discussed in the context of FIG. 9. A client may submit a ShowMetricsAndResults request 1026 to obtain values of a specified set of metrics, and/or to view the results of the pre-compute phase such as the HCR and/or the ASTR in the depicted embodiment. In response, one or more RequestedMetricsAndResults messages may be sent to the client with the desired metrics and results. A ShowMetricsAndResults request may comprise a visualization request in some embodiments, which may result in a view similar to that shown in FIG. 6 to be presented via a graphical user interface.

During the run-time clustering phase of the IPSCA, any desired number of GenerateClustersUsingHCR messages 1030 may be submitted in various embodiments, and the pre-generated HCR for the data set may be used to identify clusters with a desired level of intra-cluster similarity scores indicated in the message 1020. Information about the identified clusters may be provided to the client 1010 via one or more OutputClusters messages 1032 in the depicted embodiment. Other types of programmatic interactions, not shown in FIG. 10, may be supported by an analytics service 1099 in different embodiments.

Example Cluster-Size Based Alternatives for Spanning Tree Computations

Figure 11:
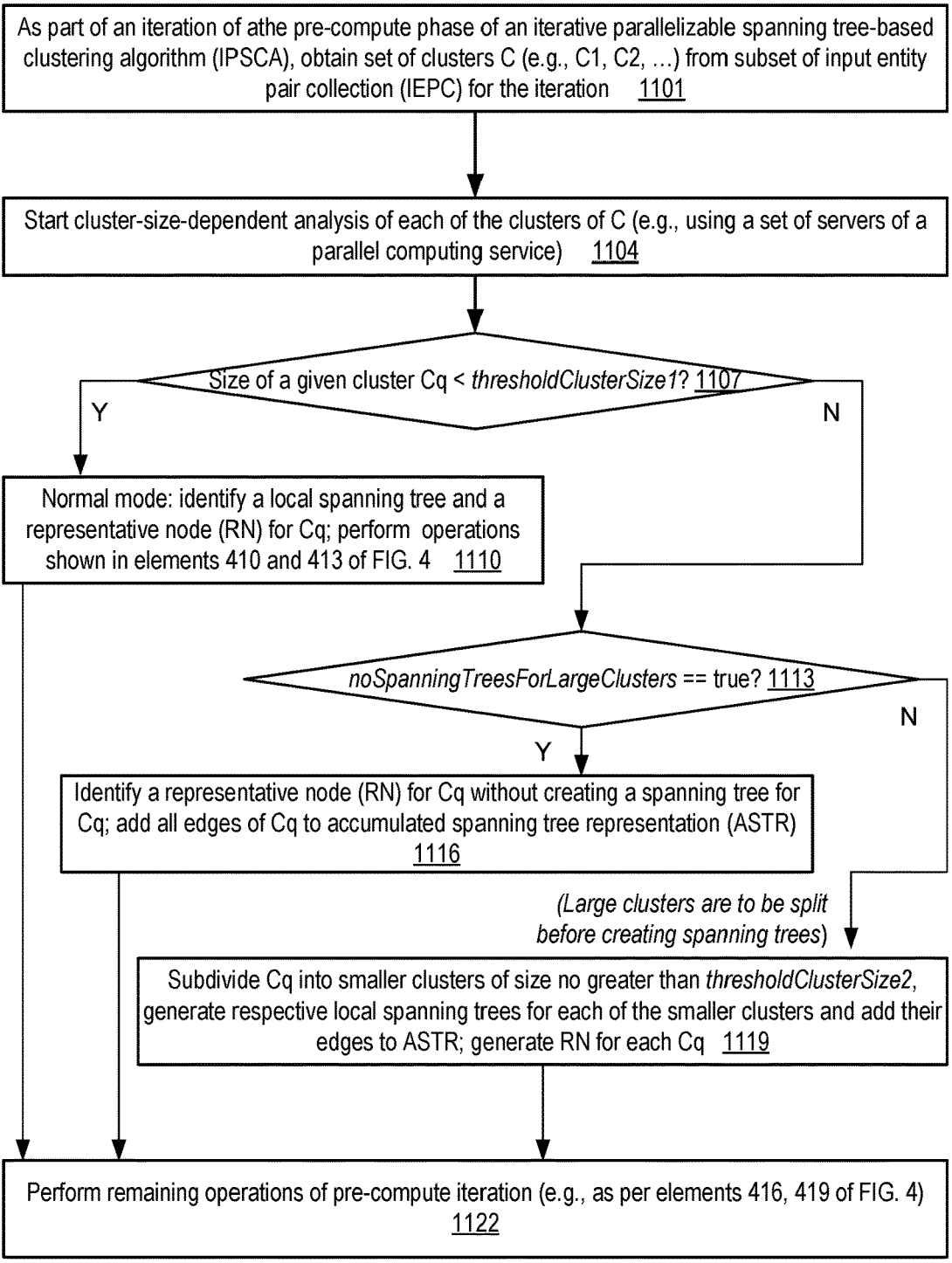
FIG. 11 is a flow diagram illustrating aspects of example cluster-size based alternative techniques which may be employed during a spanning-tree based clustering algorithm, according to at least some embodiments.

Depending on the sizes of the clusters identified from the threshold-based subset of entity pairs during the pre-compute phase of the clustering algorithm introduced earlier, the amount of computation required to actually identify the spanning trees from the clusters may vary substantially; for some cluster sizes, computing their spanning trees may become very expensive computationally. FIG. 11 is a flow diagram illustrating aspects of example cluster-size based alternative techniques which may be employed during a spanning-tree based clustering algorithm, according to at least some embodiments. As shown in element 1101, a set of clusters C (e.g., C1, C2, . . . ) may be obtained from the subset of entity pairs which meet the threshold similarity criterion for an iteration, e.g., using the connected components algorithm or a different cluster identification technique.

A cluster-size-dependent analysis of the identified clusters may then be initiated, e.g., using several servers of a parallel computing service in the depicted embodiment (element 1107), using some combination of parameters thresholdClusterSize1, noSpanningTreesForLargeClusters, and thresholdClusterSize2, and. If the size of a given cluster Cq (i.e., the number of nodes in the cluster) is smaller than parameter thresholdClusterSize1, as detected in operations corresponding to element 1107, normal mode operations may be performed for C1 (element 1110) as per elements 410 and 413 of FIG. 4. A single local spanning tree may be identified for C1 in its entirety, and a representative node (RN) may be found, e.g., using the kinds of computations illustrated in FIG. 7.

If the number of nodes in a cluster Cq exceeds thresholdClusterSize1, as also detected in operations corresponding element 1107, C1 may be classified as a "large" cluster for which one of two types of alternative or special treatment is needed in the depicted embodiment. If the parameter noSpanningTreesForLargeClusters is set to true, as detected in operations corresponding to element 1113, an RN may be identified for Cq without creating a spanning tree from Cq, and all the edges of Cq may be added to the accumulated spanning tree representation (ASTR) for the data set containing Cq in at least some embodiments (element 1116). If, in contrast, the parameter noSpanningTreesForLargeClusters is set to false in the depicted embodiment, the second alternative approach may be implemented for Cq. Cq may be subdivided into smaller clusters, of size no greater than thresholdClusterSize2, and respective spanning trees may be generated for each of the smaller clusters(element 1119). An RN may be identified for each of the smaller clusters in some embodiments for the subsequent computations of the pre-compute phase in at least one embodiment. The remaining computations of the pre-compute iteration (e.g., as per elements 416 and 419 of FIG. 4) may then be performed in each case (element 1122): e.g., in the normal mode case, the case where no spanning trees are created for large clusters, or the case where large clusters are split into smaller clusters before the spanning trees are generated. By taking alternative approaches for large clusters, some of the potentially excessive computational and/or memory costs associated with spanning tree creation may be avoided in the depicted embodiment, without affecting the quality of the clusters obtained substantially.

It is noted that in various embodiments, some of the operations shown in the flow diagrams of FIG. 3, FIG. 4, FIG. 7, FIG. 8a, and/or FIG. 11 may be implemented in a different order than that shown in the figure, or may be performed in parallel rather than sequentially. Additionally, some of the operations shown in the flow diagrams of FIG. 3, FIG. 4, FIG. 7, FIG. 8a, and/or FIG. 11 may not be required in one or more implementations.

Example Provider Network Environment

Figure 12:
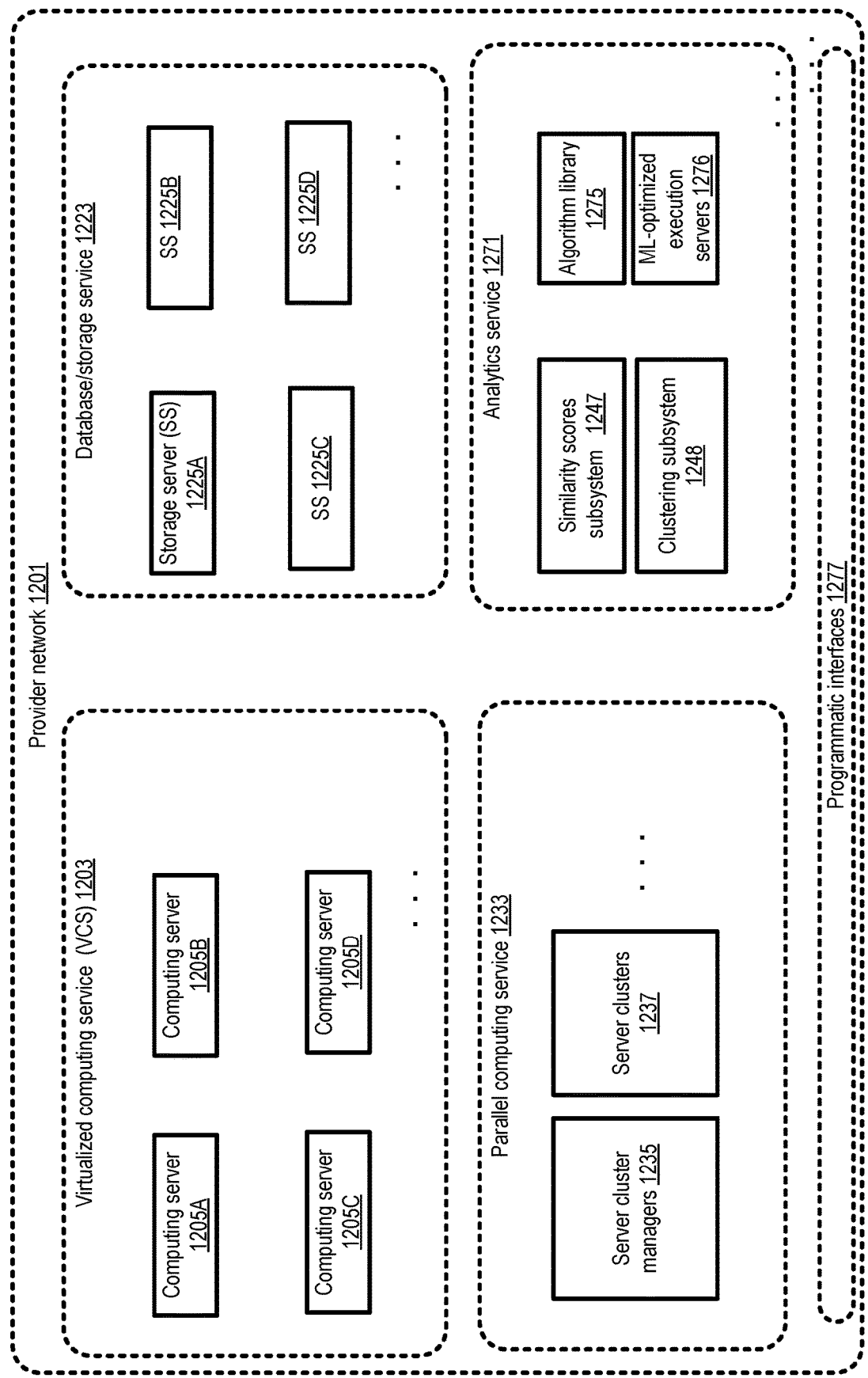
FIG. 12 illustrates an example provider network environment in which an analytics service may be implemented, according to at least some embodiments.

In some embodiments, as mentioned earlier, an analytics service similar to service 102 of FIG. 1 may be implemented at a provider network which may also implement a number of other network-accessible services. FIG. 12 illustrates an example provider network environment in which an analytics service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in various embodiments. A provider network may sometimes be referred to as a "public cloud" environment (or simply as a "cloud"), which indicates a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of at least some services of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network, etc.).

In the depicted embodiment, provider network 1201 may comprise resources used to implement a plurality of services, including for example a virtualized computing service (VCS) 1203, a database/storage service 1223, a parallel computing service 1233 as well as an analytics service 1271 similar in features and capabilities to analytics service 102 of FIG. 1. The analytics service 1271 in turn may comprise at least similarity scores subsystem 1247 (used for generating similarity scores for entity pairs) and a clustering subsystem 1248 responsible for the coordination/implementation of clustering algorithms of an algorithm library 1275, such as the iterative parallelizable spanning-tree based algorithm (IPSCA) introduced earlier. In at least some cases, machine learning models, implemented at a set of machine-learning-optimized execution servers 1276, may be employed for similarity score generation. The parallel computing service 1233 may comprise various server clusters 1237, each comprising a plurality of servers, on which parallelizable workloads may be distributed by a set of server cluster managers 1235 in the depicted embodiment.

Components of a given service may utilize components of other services in the depicted embodiment—e.g., for some analytics service tasks, virtual machines implemented at computing servers such as 1205A-1205D of the virtualized computing service 1203 may be used, server clusters 1237 and/or cluster managers 1235 may be utilized for parallelizable computations of the pre-compute phase of the IPSCA, input data and/or output produced by the IPSCA (including HCRs and ASTRs) may be stored at storage servers 1225 (e.g., 1225A-1225D) of storage service 1223, and so on. Individual ones of the services shown in FIG. 12 may implement a respective set of programmatic interfaces 1277 which can be used by external and/or internal clients (where the internal clients may comprise components of other services) in the depicted embodiment.

In some embodiments, at least some aspects of the IPSCA may be implemented without acquiring resources of network-accessible services such as those shown in FIG. 12. For example, a standalone tool implemented at one or more computing devices which are not part of a network-accessible service may be used in some embodiments.

Use Cases

The techniques described above, of utilizing a scalable spanning-tree based clustering algorithm to identify clusters of similar entities within large data sets may be useful in a variety of scenarios. For example, such techniques may be used to identify duplicate customer records for various types of organizations, to identify patients with similar symptoms in the health-care domain, and so on. In the e-retail domain, the proposed techniques may be used to identify matching items within large item catalogs, determine a set of similar items (with different target levels of similarity) to be presented in response to a search request, and so on. The proposed techniques can be implemented efficiently, e.g., using pools of servers running in parallel to perform the operations at various phases of the algorithm, thus enabling clusters to be identified very quickly for any size of input data. Furthermore, the reduction in the total number of edges achieved in the generated graph representations of the input data may allow relationships in the data to be presented via easy-to-interpret visualizations, allowing data scientists, domain experts and other users to explore and gain insights into the data more easily regardless of the specific problem being addressed.

Illustrative Computer System

Figure 13:
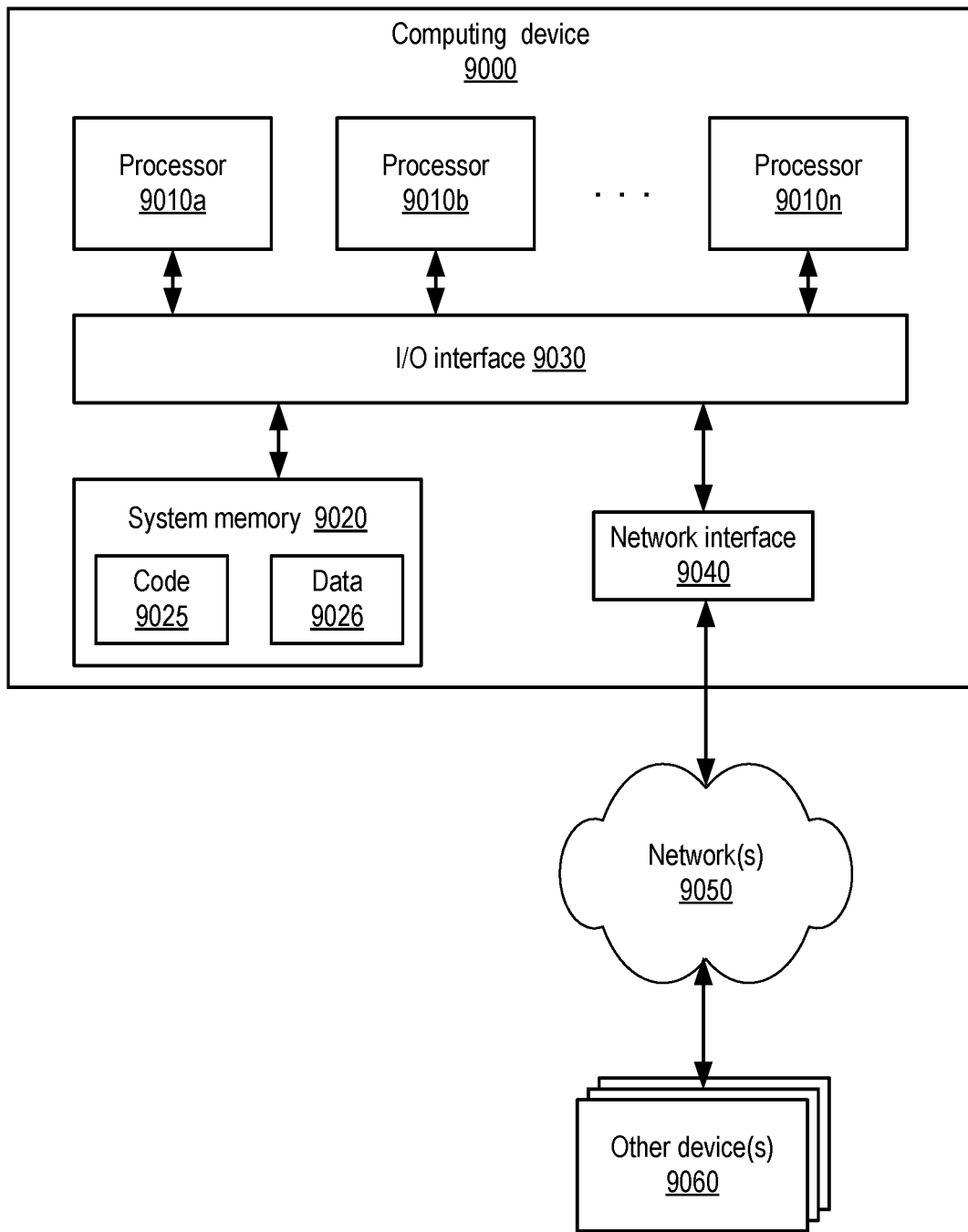
FIG. 13 is a block diagram illustrating an example computing device that may be used in at least some embodiments.

In at least some embodiments, a server that implements one or more of the techniques described herein, including for example components of analytics services at which spanning-tree based techniques for clustering are implemented and the like may include a general-purpose computer system that includes or is configured to access one or more computer-accessible media. FIG. 13 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 12, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more processors and corresponding memory of one or more computing devices;
   wherein the memory of the one or more computing devices includes instructions that upon execution on or across the one or more processors cause the one or more computing devices to:
      generate, using a plurality of analysis iterations, a hierarchical representation of an input data set, wherein the input data set comprises a plurality of entity pairs and respective similarity scores for the entity pairs, and wherein a particular analysis iteration of the plurality of analysis iteration comprises at least:
         identifying, from an input entity pair collection of the particular iteration, a subset of pairs with a similarity score above a similarity threshold of the particular iteration;
         generating, from the subset of pairs, one or more clusters, wherein a particular cluster comprises a respective plurality of nodes such that at least one path comprising one or more edges exists between a given pair of nodes, wherein individual ones of the nodes correspond to respective entities represented in the subset of pairs, and wherein individual ones of the edges correspond to respective pairs of the subset of pairs;
         identifying, corresponding to individual ones of the clusters, a respective spanning tree;
         adding, to an accumulated spanning tree representation, one or more edges of a particular spanning tree of the respective spanning trees, wherein the accumulated spanning tree representation comprises at least some edges of a spanning tree identified in a previous analysis iteration;
         adding, to the hierarchical representation, at least an indication of a representative node selected from the particular spanning tree; and
         excluding, using at least the accumulated spanning tree representation and an inter-spanning-tree edge reduction algorithm, at least some of the entity pairs of the input entity pair collection of the particular analysis iteration from an input entity pair collection for a subsequent analysis iteration;
      store the hierarchical representation; and
      in response to a run-time clustering request, received via a programmatic interface, utilize the stored hierarchical representation to provide an indication of a plurality of entities of the input data set which satisfy an intra-cluster similarity criterion.

2. The system as recited in claim 1, wherein the one or more computing devices include further instructions that upon execution on or across the one or more processors further cause the one or more computing devices to:
   select the representative node of the particular spanning tree, wherein selection of the representative node comprises:
      computing, using similarity scores corresponding to one or more edges of the particular spanning tree and shortest paths identified between pairs of nodes of the particular spanning tree, a respective first intermediate metric of similarity between pairs of nodes of the particular spanning tree;
      obtaining, for a first node of the particular spanning tree, a statistical aggregate of the respective first intermediate metrics for pairs of nodes of which the first node is a member; and
      comparing the statistical aggregate obtained for the first node with the statistical aggregate obtained for a second node of the particular spanning tree.

3. The system as recited in claim 1, wherein said generating the one or more clusters comprises:
   determining a number of computing resources to be used to generate the clusters; and
   executing a connected components algorithm in parallel at a plurality of computing resources comprising the determined number of computing resources.

4. The system as recited in claim 1, wherein said identifying, corresponding to individual ones of the clusters, the respective spanning tree comprises:
   determining a number of computing resources to be used to identify the spanning trees; and
   executing a spanning tree generation algorithm in parallel at a plurality of computing resources comprising the determined number of computing resources.

5. The system as recited in claim 1, wherein said using the inter-spanning-tree edge reduction algorithm comprises:
   determining a number of computing resources to be used to reduce edges between spanning trees; and
   executing an edge reduction algorithm in parallel at a plurality of computing resources comprising the determined number of computing resources.

6. A method, comprising:
   performing, at one or more computing devices:
      generating, using a plurality of analysis iterations, a hierarchical representation of an input data set, wherein the input data set comprises a plurality of entity pairs and respective similarity scores for the entity pairs, and wherein a particular analysis iteration of the plurality of analysis iteration comprises at least:
         obtaining one or more clusters from a subset of pairs of an input entity pair collection of the particular iteration, wherein a particular cluster comprises a respective plurality of nodes such that at least one path comprising one or more edges exists between a given pair of nodes, wherein individual ones of the nodes correspond to respective entities represented in the subset of pairs, and wherein individual ones of the edges correspond to respective pairs of the subset of pairs;

eliminating, from at least one cluster of the one or more clusters, at least one edge based at least in part on a spanning tree algorithm;

adding, to the hierarchical representation, at least an indication of a representative node corresponding to a respective cluster of the one or more clusters; and using at least an inter-cluster edge aggregation technique to exclude, from an input entity pair collection for a subsequent analysis iteration, at least some of the entity pairs of the input entity pair collection of the particular analysis iteration;

utilizing the hierarchical representation to provide a response to a first clustering request directed to the input data set; and transmitting an indication of a particular cluster to one or more downstream applications, wherein the particular cluster is identified using the hierarchical representation, and wherein a particular downstream application of the one or more downstream applications comprises one or more of: (a) a search application of an e-retail web site, (b) a catalog management application, or (c) a comment analysis application.

7. The method as recited in claim 6, wherein the first clustering request indicates a first intra-cluster similarity criterion, and wherein the response provided to the first clustering request comprises a first plurality of entities represented in the input data set which satisfy the first intra-cluster similarity criterion, the method further comprising performing, at the one or more computing devices:

storing the hierarchical representation at one or more persistent storage devices; and generating, using the stored hierarchical representation, a response to a second clustering request indicating a different intra-cluster similarity criterion without re-generating the hierarchical representation, wherein the response to the different clustering request comprises a second plurality of entities represented in the input data set which satisfy the different intra-cluster similarity criterion.

8. The method as recited in claim 6, further comprising performing, at the one or more computing devices:

identifying the representative node corresponding to a particular cluster of the plurality of clusters, wherein said identifying comprises:

computing, using similarity scores corresponding to one or more edges of the particular cluster and shortest paths identified between pairs of nodes of the particular cluster, a respective first intermediate metric of similarity between pairs of nodes of the particular cluster;

obtaining, for a first node of the particular cluster, a statistical aggregate of the respective first intermediate metrics for pairs of nodes of which the first node is a member; and comparing the statistical aggregate obtained for the first node with the statistical aggregate obtained for a second node of the particular cluster.

9. The method as recited in claim 6, wherein said obtaining the one or more clusters comprises:

executing a connected components algorithm in parallel at a plurality of computing resources.

10. The method as recited in claim 6, wherein said eliminating, from at least one cluster of the one or more clusters, at least one edge based at least in part on a spanning tree algorithm comprises:

executing a spanning tree generation algorithm in parallel at a plurality of computing resources.

11. The method as recited in claim 6, wherein said using the inter-cluster edge aggregation technique comprises:

executing an edge reduction algorithm in parallel at a plurality of computing resources.

12. The method as recited in claim 6, further comprising performing, at the one or more computing devices:

obtaining, via one or more programmatic interfaces, a request to prepare the hierarchical representation, wherein plurality of analysis iterations is initiated in response to the request.

13. The method as recited in claim 6, further comprising performing, at the one or more computing devices:

causing to be presented, in response to a programmatic request, a graphical view of at least a portion of the hierarchical representation, wherein in the graphical view, a visual property of an icon representing a particular representative node of a particular cluster indicates a centrality measure computed with respect to the particular representative node and the particular cluster.

14. The method as recited in claim 6, further comprising performing, at the one or more computing devices:

providing, via one or more programmatic interfaces, respective indications of one or more metrics computed with respect to one or more clusters identified in the analysis iterations, including one or more of: (a) a precision metric, (b) a reduction rate metric, or (c) a cluster size metric.

15. One or more non-transitory computer-accessible storage media storing program instructions that when executed on or across one or more processors cause one or more computer systems to:

generate, using one or more analysis iterations, a hierarchical representation of an input data set, wherein the input data set comprises a plurality of entity pairs and respective similarity scores for the entity pairs, and wherein a particular analysis iteration of the one or more analysis iteration comprises at least:

obtaining one or more clusters from a subset of pairs of an input entity pair collection of the particular iteration, wherein a particular cluster comprises a respective plurality of nodes such that at least one path comprising one or more edges exists between a given pair of nodes, wherein individual ones of the nodes correspond to respective entities represented in the subset of pairs, and wherein individual ones of the edges correspond to respective pairs of the subset of pairs;

eliminating, from at least one cluster of the one or more clusters, at least one edge based at least in part on a spanning tree algorithm; and adding, to the hierarchical representation, at least an indication of a representative node corresponding to a respective cluster of the one or more clusters;

store the hierarchical representation at one or more persistent storage devices;

utilize at least the stored hierarchical representation to respond to a first clustering request directed to the input data set, wherein the first clustering request indicates a first intra-cluster similarity criterion, and wherein a response provided to the first clustering request comprises a first plurality of entities represented in the input data set which satisfy the first intra-cluster similarity criterion; and generate, using the stored hierarchical representation, a response to a second clustering request indicating a second intra-cluster similarity criterion without re-generating the hierarchical representation, wherein the response to the second clustering request comprises a second plurality of entities represented in the input data set which satisfy the second intra-cluster similarity criterion.

16. The one or more non-transitory computer-accessible storage media as recited in claim 15, store further program instructions that when executed on or across the one or more processors further cause one or more computer systems to:

identify the representative node corresponding to a particular cluster of the plurality of clusters, wherein an identification of the representative node comprises:
  computing, using similarity scores corresponding to one or more edges of the particular cluster and shortest paths identified between pairs of nodes of the particular cluster, a respective first intermediate metric of similarity between pairs of nodes of the particular cluster;
  obtaining, for a first node of the particular cluster, a statistical aggregate of the respective first intermediate metrics for pairs of nodes of which the first node is a member; and
  comparing the statistical aggregate obtained for the first node with the statistical aggregate obtained for a second node of the particular cluster.

17. The one or more non-transitory computer-accessible storage media as recited in claim 15, store further program instructions that when executed on or across the one or more processors further cause one or more computer systems to:

determine, based at least in part on a size of a particular cluster of the one or more clusters, whether to generate a spanning tree of the particular cluster.

18. The one or more non-transitory computer-accessible storage media as recited in claim 15, store further program instructions that when executed on or across the one or more processors further cause one or more computer systems to:

subdivide, based at least in part on a size of a particular cluster of the one or more clusters, the particular cluster into a plurality of sub-clusters; and generate respective spanning trees for individual ones of the sub-clusters.

* * * * *